(12) United States Patent
Zambelli et al.

(10) Patent No.: US 7,726,617 B2
(45) Date of Patent: Jun. 1, 2010

(54) FLAT PANEL DISPLAY MOUNTING SYSTEM

(75) Inventors: Michael P. Zambelli, Basking Ridge, NJ (US); Jimmy An, South Plainfield, NJ (US); In-Young Jang, Ridgefield, NJ (US); Steven J. Sculler, Morganville, NJ (US)

(73) Assignee: Bell'O International Corp., Morganville, NJ (US)

( * ) Notice: Subject to any disclaimer, the term of this patent is extended or adjusted under 35 U.S.C. 154(b) by 18 days.

(21) Appl. No.: 12/005,123

(22) Filed: Dec. 21, 2007

(65) Prior Publication Data

US 2008/0192418 A1    Aug. 14, 2008

Related U.S. Application Data

(60) Provisional application No. 60/878,003, filed on Dec. 28, 2006.

(51) Int. Cl.
*F16M 13/00* (2006.01)
(52) U.S. Cl. .............. 248/288.31; 248/222.12; 248/223.41
(58) Field of Classification Search ........... 248/223.41, 248/224.51, 224.7, 220.21, 223.31, 371, 248/200, 222.41, 300
See application file for complete search history.

(56) References Cited

U.S. PATENT DOCUMENTS

| | | | | |
|---|---|---|---|---|
| 266,446 | A * | 10/1882 | Eager | 248/224.7 |
| 965,658 | A * | 7/1910 | Reubel | 248/262 |
| 1,720,309 | A * | 7/1929 | Wakefield | 224/547 |
| 2,124,541 | A * | 7/1938 | Cassey | 248/223.41 |
| 2,588,009 | A * | 3/1952 | Jones | 248/489 |
| 4,113,217 | A * | 9/1978 | O'Connell | 248/222.11 |
| D294,006 | S | 2/1988 | Gygax et al. | |
| 4,814,759 | A | 3/1989 | Gombrich et al. | |
| 4,826,123 | A | 5/1989 | Hannah et al. | |
| D312,038 | S | 11/1990 | Sachs et al. | |
| D315,863 | S | 4/1991 | Shui-Mu et al. | |
| 5,321,579 | A | 6/1994 | Brown et al. | |
| D358,319 | S | 5/1995 | Porcaro et al. | |
| D363,492 | S | 10/1995 | Brussing et al. | |
| D391,148 | S | 2/1998 | Rosen | |
| 5,743,503 | A | 4/1998 | Voeller et al. | |
| D394,646 | S | 5/1998 | Ratzlaff et al. | |
| 5,842,672 | A | 12/1998 | Sweere et al. | |
| 5,865,562 | A * | 2/1999 | Mallek | 403/403 |
| 5,871,188 | A * | 2/1999 | Lyle | 248/223.41 |
| 5,924,665 | A | 7/1999 | Sweere et al. | |
| 5,961,085 | A | 10/1999 | Navarro et al. | |
| 5,992,809 | A | 11/1999 | Sweere et al. | |
| 6,019,332 | A | 2/2000 | Sweere et al. | |
| 6,102,348 | A | 8/2000 | O'Neill | |
| D435,852 | S | 1/2001 | Oddsen, Jr. | |
| 6,361,007 | B1 | 3/2002 | Oby et al. | |
| 6,367,756 | B1 | 4/2002 | Wang | |
| 6,371,424 | B1 * | 4/2002 | Shaw | 248/222.12 |

(Continued)

*Primary Examiner*—J. Allen Shriver, II
*Assistant Examiner*—Alaeddin Mohseni
(74) *Attorney, Agent, or Firm*—Lerner, David, Littenberg, Krumholz & Mentlik, LLP

(57) ABSTRACT

A television mounting system is disclosed. It includes a wall plate adapted to be secured to a wall and a monitor plate mountable on the wall plate. Expansion plates may be secured at selected locations on the monitor plate to accommodate mounting of various sizes of display screens, such as flat panel televisions.

5 Claims, 27 Drawing Sheets

U.S. PATENT DOCUMENTS

| | | |
|---|---|---|
| 6,402,109 B1 | 6/2002 | Dittmer |
| 6,419,196 B1 | 7/2002 | Sweere et al. |
| D469,004 S | 1/2003 | Winig et al. |
| D472,793 S | 4/2003 | Callahan et al. |
| D473,562 S | 4/2003 | Russell |
| D473,563 S | 4/2003 | Russell |
| 6,543,734 B2 | 4/2003 | Yeh et al. |
| 6,554,242 B2 | 4/2003 | Kim et al. |
| D475,057 S | 5/2003 | Lord |
| 6,559,829 B1 | 5/2003 | Matsuo et al. |
| 6,575,419 B1 | 6/2003 | Masuda et al. |
| 6,585,203 B1 | 7/2003 | Euker |
| 6,604,722 B1 | 8/2003 | Tan et al. |
| D480,948 S | 10/2003 | Patrizzi et al. |
| D488,708 S | 4/2004 | Lam et al. |
| D489,377 S | 5/2004 | van Kuijk et al. |
| D489,599 S | 5/2004 | Lam |
| 6,752,363 B2 | 6/2004 | Boele et al. |
| D493,800 S | 8/2004 | Pfister et al. |
| D494,596 S | 8/2004 | Pfister |
| D494,978 S | 8/2004 | Pfister |
| 6,783,105 B2 | 8/2004 | Oddsen, Jr. |
| D495,713 S | 9/2004 | Pfister et al. |
| D496,367 S | 9/2004 | Pfister |
| 7,175,146 B2 | 3/2005 | Kim |
| 6,886,701 B2 | 5/2005 | Hong et al. |
| D505,858 S | 6/2005 | O'Keene |
| 6,905,101 B1 | 6/2005 | Dittmer |
| D507,477 S | 7/2005 | Pfister |
| 6,915,996 B2 | 7/2005 | Lin et al. |
| 6,923,413 B2 | 8/2005 | Dozier |
| 6,964,399 B1 | 11/2005 | O'Neill |
| 7,000,878 B2 | 2/2006 | Lin et al. |
| D517,085 S | 3/2006 | Deuschle |
| D520,017 S | 5/2006 | van Kuijk et al. |
| 7,100,880 B2 | 9/2006 | Oddsen, Jr. |
| D533,547 S | 12/2006 | Sergi |
| D535,985 S | 1/2007 | Sergi |
| D539,127 S | 3/2007 | Ly Hau et al. |
| D540,154 S | 4/2007 | Bremmon |
| D540,332 S | 4/2007 | Dittmer et al. |
| D543,210 S | 5/2007 | Stenhouse et al. |
| D543,211 S | 5/2007 | Petrick et al. |
| 7,261,265 B2 | 8/2007 | Burns |
| 7,273,203 B2 * | 9/2007 | Carnevali ................... 248/553 |
| D552,974 S | 10/2007 | Petrick et al. |
| D554,135 S | 10/2007 | Lim et al. |
| 7,284,671 B1 | 10/2007 | Doscher |
| 7,300,029 B2 | 11/2007 | Petrick et al. |
| D558,560 S | 1/2008 | Ciungan |
| D558,561 S | 1/2008 | Ciungan |
| D558,562 S | 1/2008 | Ciungan et al. |
| D558,563 S | 1/2008 | Ciungan |
| D558,771 S | 1/2008 | Derry et al. |
| D558,772 S | 1/2008 | Derry et al. |
| D558,773 S | 1/2008 | Derry et al. |
| D559,087 S | 1/2008 | Ciungan |
| D560,221 S | 1/2008 | Hoglan et al. |
| D560,222 S | 1/2008 | Anderson et al. |
| D560,470 S | 1/2008 | Short et al. |
| D560,671 S | 1/2008 | Muday et al. |
| D560,672 S | 1/2008 | Muday et al. |
| D560,674 S | 1/2008 | Wohlford et al. |
| D560,675 S | 1/2008 | Wohlford et al. |
| D560,676 S | 1/2008 | Wohlford et al. |
| D560,677 S | 1/2008 | Wohlford et al. |
| D561,188 S | 2/2008 | Wohlford et al. |
| D561,189 S | 2/2008 | Wohlford et al. |
| D561,748 S | 2/2008 | Sculler et al. |
| D561,749 S | 2/2008 | Sculler et al. |
| D561,775 S | 2/2008 | Wohlford et al. |
| D562,113 S | 2/2008 | Ciungan et al. |
| 7,334,762 B2 | 2/2008 | Dittmer |
| D563,398 S | 3/2008 | Wohlford et al. |
| D563,774 S | 3/2008 | Wohlford et al. |
| D563,962 S | 3/2008 | Grey |
| D568,890 S | 5/2008 | Sculler et al. |
| 7,455,271 B2 * | 11/2008 | Pincek et al. .......... 248/288.31 |
| 2002/0033436 A1 | 3/2002 | Peng et al. |
| 2002/0179791 A1 | 12/2002 | Kwon |
| 2002/0179801 A1 | 12/2002 | Kim |
| 2003/0132356 A1 | 7/2003 | Copeland |
| 2003/0136888 A1 | 7/2003 | Boele |
| 2003/0154673 A1 | 8/2003 | MacGregor et al. |
| 2003/0201372 A1 | 10/2003 | Dozier |
| 2004/0159757 A1 | 8/2004 | Pfister |
| 2004/0195472 A1 | 10/2004 | Clover |
| 2004/0211870 A1 | 10/2004 | Bremmon et al. |
| 2004/0232298 A1 | 11/2004 | Bremmon et al. |
| 2004/0245420 A1 | 12/2004 | Pfister et al. |
| 2004/0251388 A1 | 12/2004 | Williams |
| 2004/0262474 A1 * | 12/2004 | Boks et al. ............... 248/276.1 |
| 2005/0061937 A1 | 3/2005 | Kim |
| 2005/0082453 A1 * | 4/2005 | Chuang .................... 248/300 |
| 2005/0092873 A1 | 5/2005 | Lin |
| 2005/0092890 A1 | 5/2005 | Liao |
| 2005/0121577 A1 | 6/2005 | Oddsen et al. |
| 2005/0127261 A1 | 6/2005 | Lin |
| 2005/0133678 A1 | 6/2005 | Dittmer |
| 2005/0152102 A1 | 7/2005 | Shin |
| 2005/0231658 A1 | 10/2005 | Chieh |
| 2005/0236542 A1 | 10/2005 | O'Neill |
| 2005/0236543 A1 | 10/2005 | O'Neil |
| 2005/0242254 A1 | 11/2005 | Dozier |
| 2005/0253035 A1 | 11/2005 | Dozier |
| 2005/0263659 A1 | 12/2005 | Pfister et al. |
| 2005/0263671 A1 | 12/2005 | Lo |
| 2005/0274858 A1 | 12/2005 | Fedewa |
| 2006/0091274 A1 | 5/2006 | Asamarai et al. |
| 2006/0291152 A1 | 12/2006 | Bremmon |
| 2007/0023593 A1 | 2/2007 | Fedewa |
| 2007/0170336 A1 | 7/2007 | Li |
| 2008/0099646 A1 | 5/2008 | Kobara et al. |

* cited by examiner

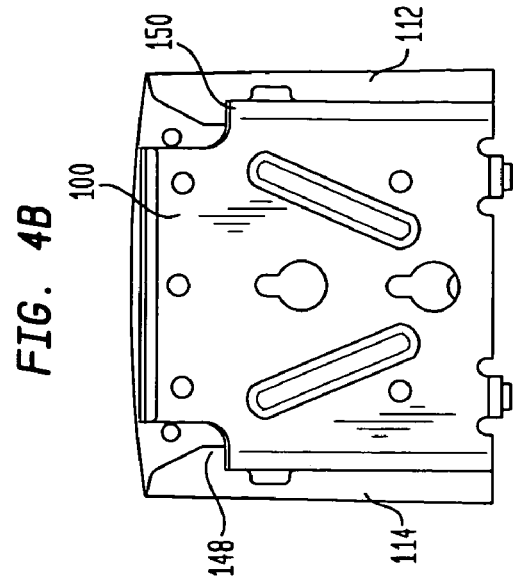
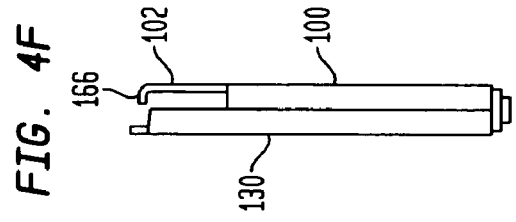
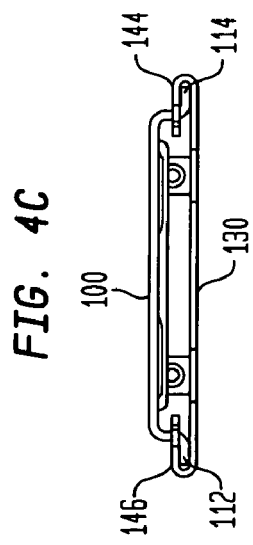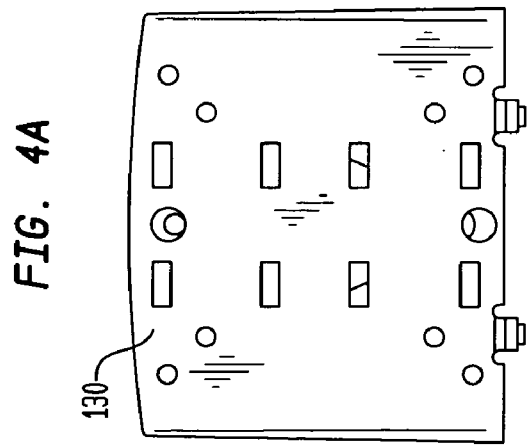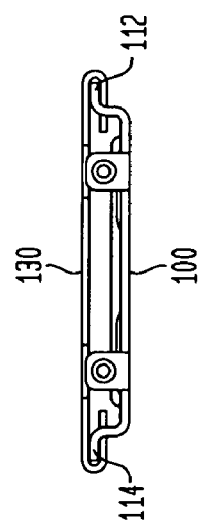
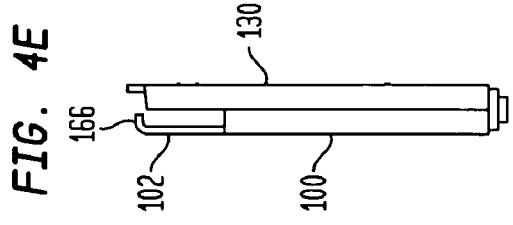

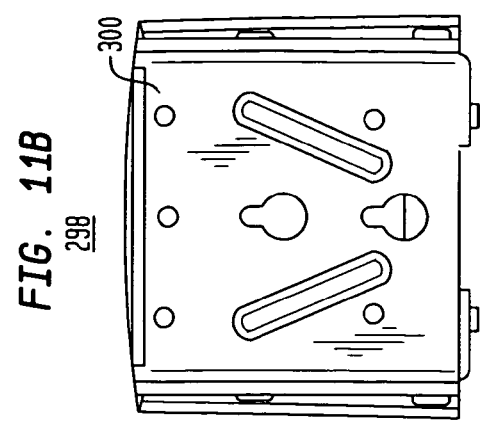
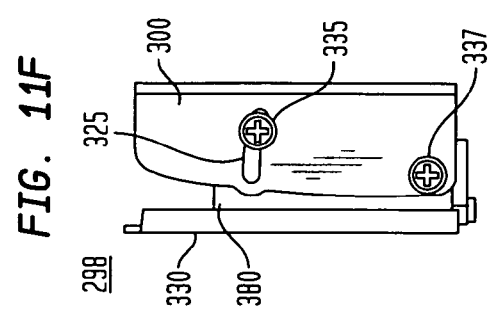
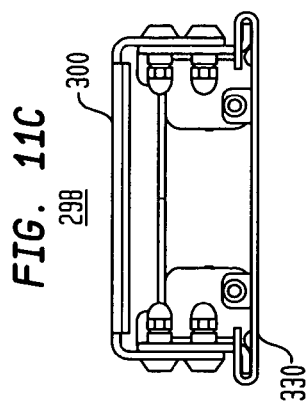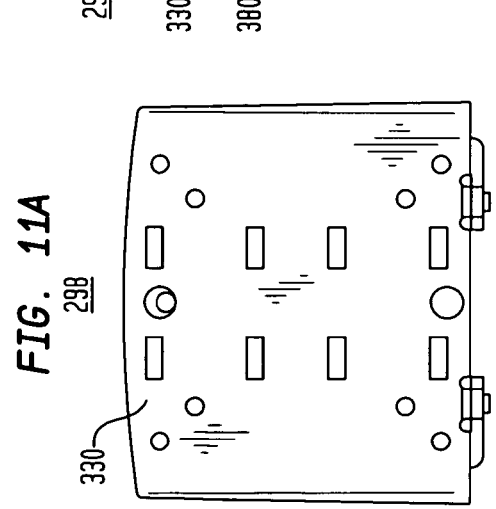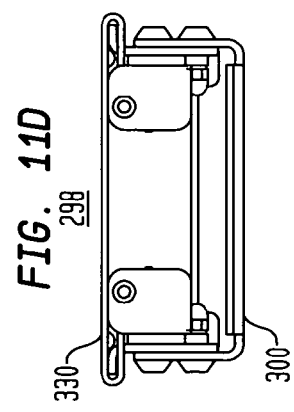
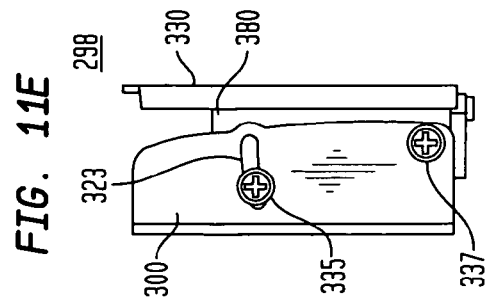

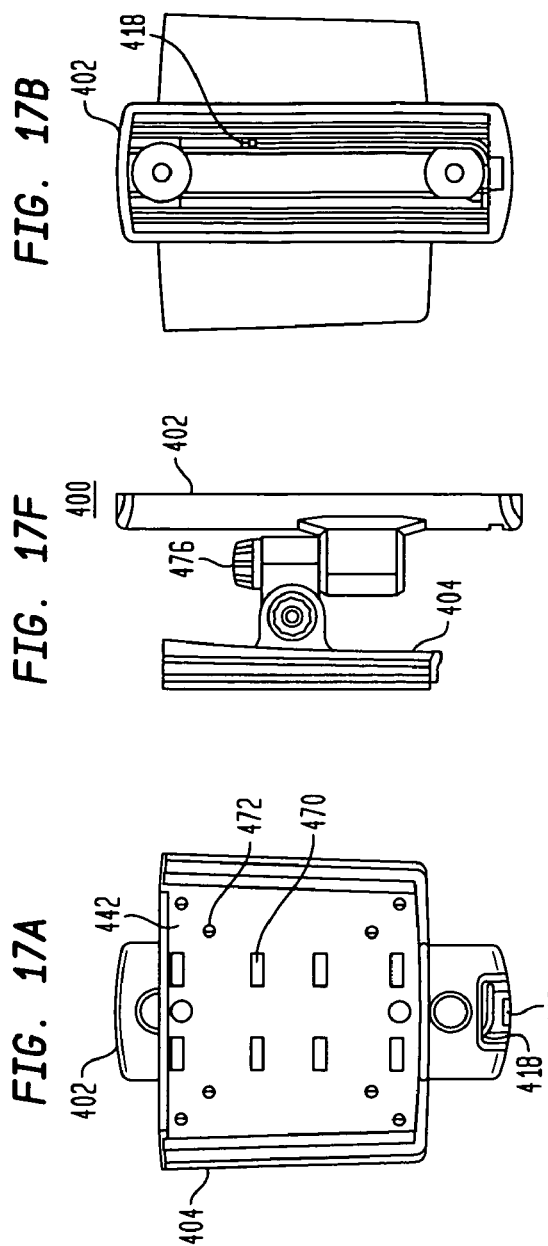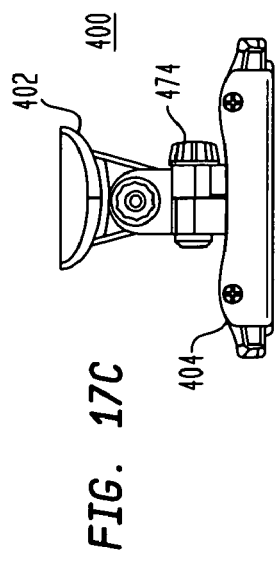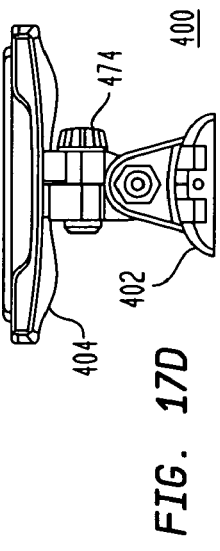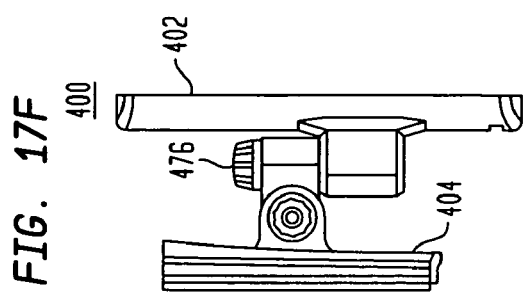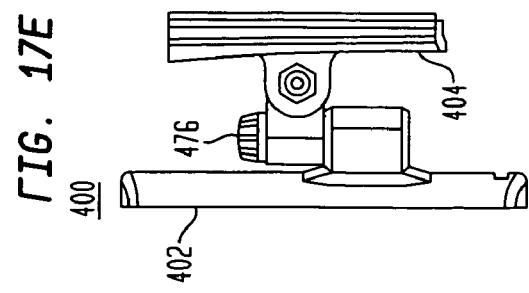

700

700

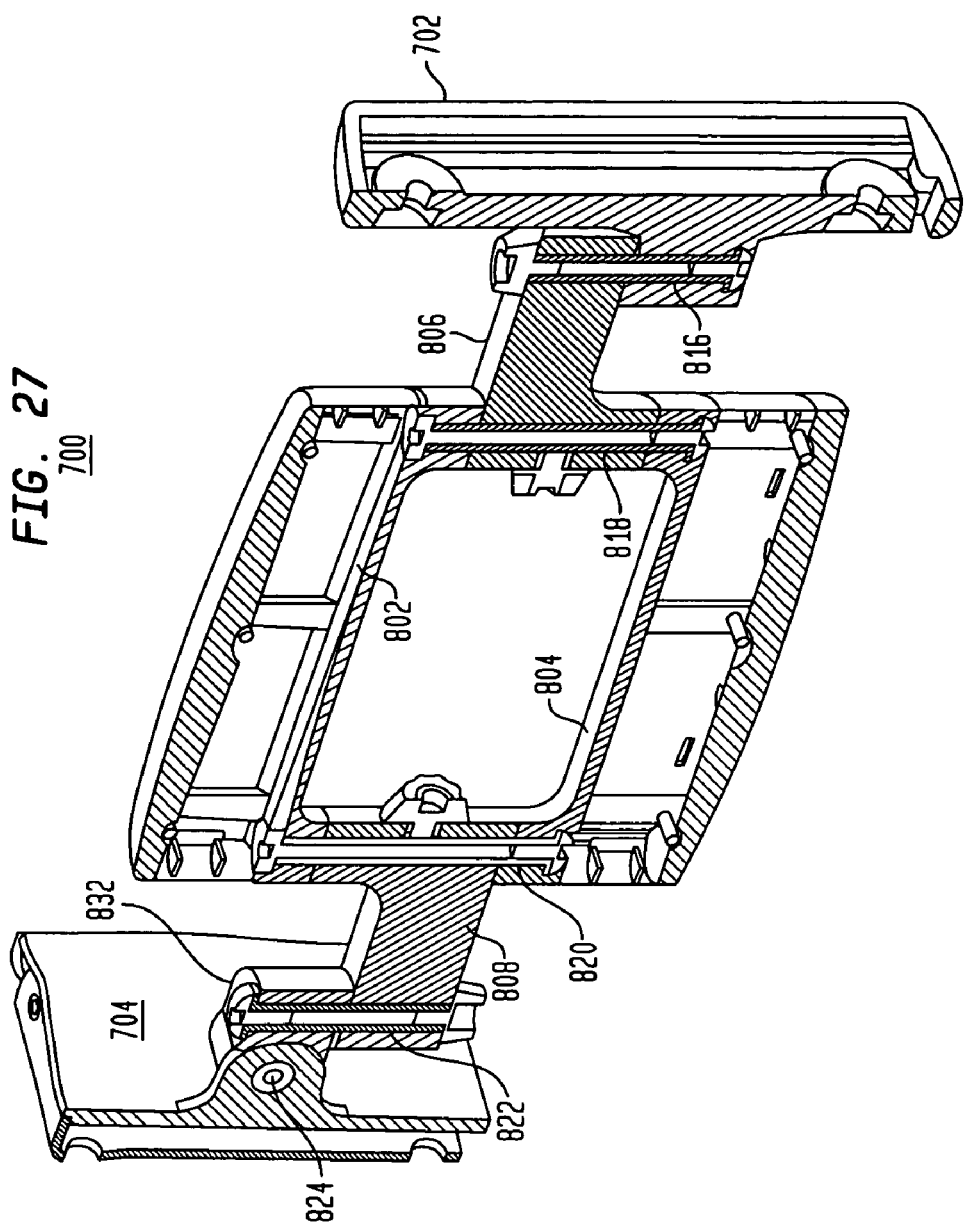
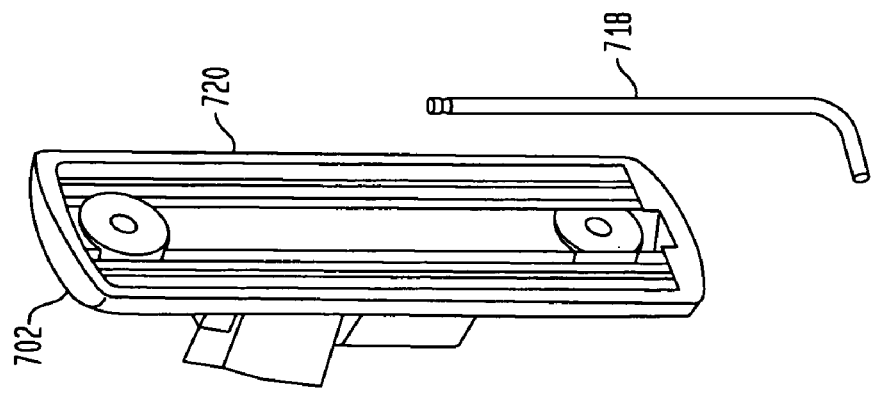

700

FLAT PANEL DISPLAY MOUNTING SYSTEM

CROSS-REFERENCE TO RELATED APPLICATION

The present application claims the benefit of Application Ser. No. 60/878,003, filed Dec. 28, 2006, entitled "Flat Panel Display Mounting System," the disclosure of which is hereby incorporated herein by reference.

BACKGROUND OF THE INVENTION

The present invention relates to television displays and more particularly relates to television mounting systems for flat panel displays.

Recently, there has been a marked growth in the popularity of flat panel displays, and in particular flat panel televisions. Flat panel televisions presently use one of two technologies, either liquid crystal or plasma display, to provide a display screen that is much thinner and lighter than traditions cathode ray televisions or projection televisions. Flat panel televisions are also versatile and that they can be placed on a stand or mounted on numerous surfaces such as a wall.

The variety and accessibility of flat panel televisions is increasing as more manufacturers enter the market and larger flat panel televisions are produced. Presently, each manufacturer of flat panel televisions offer mounting brackets, stands or other hardware that is uniquely designed to mount that particular brand of flat panel television. There are also a number of mounting systems that can be used interchangeably with different flat panel televisions, however, these mounting systems typically require a mounting plate that is specific to each unique flat panel television product.

Many of the mounting systems that are available are not versatile. These mounting systems are designed for mounting a particular flat panel television. Thus, there is a need for mounting systems that are able to mount a wide range of flat panel televisions. There's also a need for mounting systems that do not require significant man power. As is well-known to those skilled in the art, many of the mounting systems require three or more individuals to work together to mount a flat panel televisions to a wall. Thus, there remains a need for televisions mounting systems that require less man power for mounting a flat panel television to a wall. There's also a need for television mounting systems that more adequately protect the flat panel television mounting thereto. Finally, there remains a need for flat panel television mounting systems that enable the mounted flat panel television to be properly oriented for maximum viewing quality.

SUMMARY OF THE INVENTION

In one preferred embodiments of the present invention, a television mounting system includes a wall plate having an upper end, a lower end, and first and second sides extending between the upper and lower ends, and a support flange extending along the upper end of the wall plate. The wall plate may have at least one support rib integrally formed with and projecting from the wall plate. The wall plate desirably has an inner face and an outer face, and the at least one support rib projects from the inner face. The at least one support rib may include a pair of support ribs having a V-shaped configuration. A first mating flange preferably extends along the first side of the wall plate and a second mating flange preferably extends along the second side of the wall plate. The first and second mating flanges may include curved surfaces.

The wall plate may have openings extending therethrough for securing the wall plate to a surface, the openings including a pair of aligned keyhole-shaped openings extending through the wall plate and a smaller opening aligned with the pair of keyhole-shaped openings and located between the pair of keyhole-shaped openings and the upper end of the wall plate. One or more flanges, such as one or more L-shaped flanges, may project from a lower end of the wall plate. The flanges desirably have threaded openings. In certain preferred embodiments, inserts having threaded central openings may be inserted into openings in the flanges.

The television mounting system may also include a monitor plate mountable on the wall plate, the monitor plate having an inner face, an outer face, an upper end, a lower end and first and second sides extending between the upper and lower ends. A first mounting flange having a first hook may extend along the first side of the monitor plate and a second mounting flange having a second hook may extend along the second side of the monitor plate. When mounting the monitor plate on the wall plate, the first and second hooks of the mounting flanges desirably engage the first and second mating flanges on the wall plate. In one embodiment, the monitor plate has openings extending therethrough for securing the monitor plate to a television monitor. The monitor plate may also have openings extending therethrough for securing at least one expansion plate to the monitor plate.

In certain preferred embodiments, L-shaped flanges project from a lower end of the monitor plate, the L-shaped flanges have threaded openings that are alignable with the threaded openings on the wall plate when the monitor plate is mounted on the wall plate.

The at least one expansion plate desirably includes a top expansion plate having an upper end, a lower end, and at least one support hook insertable into at least one of the second openings in the monitor plate for securing the top expansion plate to the monitor plate. The at least one expansion plate may also include a bottom expansion plate having an upper end, a lower end and at least one support hook insertable into at least one of the second openings in the monitor plate for securing the bottom expansion plate to the monitor plate. The at least one support hook on the top expansion plate preferably extends toward the lower end of the top expansion plate and the at least one support hook on the bottom expansion plate preferably extends toward the lower end of the bottom expansion plate. The top expansion plate desirably includes first openings for securing the top expansion plate to the monitor plate and second openings for securing the top expansion plate to a television monitor. The bottom expansion plate desirably includes first openings for securing the bottom expansion plate to the monitor plate and second openings for securing the bottom expansion plate to a television monitor.

In certain preferred embodiments, the top expansion plate includes a pair of support arms that extend outwardly from the monitor plate, whereby each support arm has an opening for securing the support arm to a television monitor and a support rib that surrounds the opening and extends to a location adjacent the monitor plate, the support rib enhancing the structural integrity of the support arms of the top expansion plate. The bottom expansion plate may include a pair of support arms that extend outwardly from the monitor plate, whereby each support arm includes an opening for securing the support arm to a television monitor and a support rib that surrounds the opening and extends to a location adjacent the monitor plate, the rib enhancing the structural integrity of the support arms of the bottom expansion plate.

In another preferred embodiment of the present invention, a television mounting system includes a wall plate having an upper end, a lower end, and first and second sides extending between the upper and lower ends, and at least one support rib integrally formed with and projecting from the wall plate. The wall plate desirably has an inner face and an outer face, and the at least one support rib projects from the inner face. The at least one support rib preferably comprises a pair of support ribs having a V-shaped configuration.

The mounting system may also include a first mating flange extending along the first side of the wall plate, and a second mating flange extending along the second side of the wall plate. The wall plate preferably has openings extending through the wall plate for securing the wall plate to a surface, the openings including a pair of aligned keyhole-shaped openings extending through the wall plate and a smaller opening aligned with the pair of keyhole-shaped openings and located between the pair of keyhole-shaped openings and the upper end of the wall plate.

The mounting system may also include a monitor plate mountable on the wall plate, the monitor plate having an inner face, an outer face, an upper end, a lower end and first and second sides extending between the upper and lower ends, a first mounting flange having a first hook extending along the first side of the monitor plate, and a second mounting flange having a second hook extending along the second side of the monitor plate, whereby when mounting the monitor plate on the wall plate the first and second hooks of the mounting flanges engage the first and second mating flanges on the wall plate.

In another preferred embodiment of the present invention, a television mounting system includes a wall plate having an upper end, a lower end, and first and second sides extending between the upper and lower ends, a first mating flange extending along the first side of the wall plate, and a second mating flange extending along the second side of the wall plate. The mounting system desirably includes a monitor plate mountable on the wall plate, the monitor plate having an inner face, an outer face, an upper end, a lower end and first and second sides extending between the upper and lower ends. The system preferably includes a first mounting flange having a first hook extending along the first side of the monitor plate, and a second mounting flange having a second hook extending along the second side of the monitor plate. After the monitor plate has been secured to a television, the monitor plate may be mounted on the wall plate. When mounting the monitor plate on the wall plate, the first and second hooks of the mounting flanges preferably engage the first and second mating flanges on the wall plate.

The monitor plate preferably comprises first openings extending through the monitor plate for securing the monitor plate to a television monitor. The monitor plate may have second openings extending through the monitor plate for securing at least one expansion plate to the monitor plate. In certain preferred embodiments, the at least one expansion plate include a top expansion plate having an upper end, a lower end, and at least one support hook insertable into at least one of the second openings in the monitor plate for securing the top expansion plate to the monitor plate, and a bottom expansion plate having an upper end, a lower end and at least one support hook insertable into at least one of the second openings in the monitor plate for securing the bottom expansion plate to the monitor plate. The at least one support hook on the top expansion plate preferably extends toward the lower end of the top expansion plate and the at least one support hook on the bottom expansion plate preferably extends toward the lower end of the bottom expansion plate.

The top expansion plate may include first openings for securing the top expansion plate to the monitor plate and second openings for securing the top expansion plate to a television monitor. Similarly, the bottom expansion plate may include first openings for securing the bottom expansion plate to the monitor plate and second openings for securing the bottom expansion plate to a television monitor.

In another preferred embodiment of the present invention, a television mounting system includes a monitor plate having openings extending therethrough, at least one expansion plate having at least one support hook insertable into one of the openings extending through the monitor plate for securing the at least one expansion plate to the monitor plate. The at least one expansion plate desirably includes a top expansion plate having an upper end, a lower end, and at least one support hook insertable into at least one of the openings in the monitor plate for securing the top expansion plate to the monitor plate, and a bottom expansion plate having an upper end, a lower end and at least one support hook insertable into at least one of the openings in the monitor plate for securing the bottom expansion plate to the monitor plate.

In one preferred embodiment of the present invention, a television mounting system includes a monitor plate having a plurality of openings extending therethrough, the plurality of openings including central openings and peripheral openings outside the central openings, and at least one expansion plate having at least one support hook insertable into one of the plurality of openings extending through the monitor plate for securing the at least one expansion plate to the monitor plate. The at least one expansion plate desirably includes a top expansion plate having an upper end, a lower end, and at least one support hook insertable into at least one of the plurality of openings extending through the monitor plate for securing the top expansion plate to the monitor plate, and a bottom expansion plate having an upper end, a lower end and at least one support hook insertable into at least one of the plurality of openings extending through the monitor plate for securing the bottom expansion plate to the monitor plate. The support hooks are preferably insertable into the peripheral openings for increasing an area covered by the top and bottom expansion plates and are insertable into the central openings for reducing the area covered by the top and bottom expansion plates.

In another preferred embodiment of the present invention, a television mounting system includes a wall plate, a tilt mechanism coupled with the wall plate for tilting to selected angles relative to the wall plate, and a monitor plate having openings extending therethrough for securing the monitor plate to a television monitor, the monitor plate being mountable on the tilt mechanism. The wall plate is desirably coupled with the tilt mechanism using fixed fasteners so that the tilt mechanism cannot be accidentally disassembled from the wall plate. The wall plate preferably has first and second sides extending between upper and lower ends thereof, the sides having elongated slots formed therein that receive one or more of the fixed fasteners. The fixed fasteners are preferably slidable in the elongated slots during tilting movement of the tilt mechanism relative to the wall plate.

The mounting system may also include at least one expansion plate securable to the monitor plate. The at least one expansion plate may include a top expansion plate having an upper end, a lower end, and at least one support hook insertable into at least one of the second openings in the monitor plate for securing the top expansion plate to the monitor plate, and a bottom expansion plate having an upper end, a lower end and at least one support hook insertable into at least one of the second openings in the monitor plate for securing the bottom expansion plate to the monitor plate. The top expansion plate may include a pair of support arms that extend outwardly from the monitor plate, whereby each support arm includes an opening for securing the support arm to a television monitor and a support rib that surrounds the opening and extends to a location adjacent the monitor plate, the rib enhancing the structural integrity of the support arms of the top expansion plate. The bottom expansion plate desirably includes a pair of support arms that extend outwardly from the monitor plate, whereby each support arm includes an opening for securing the support arm to a television monitor and a support rib that surrounds the opening and extends to a location adjacent the monitor plate, the rib enhancing the structural integrity of the support arms of the bottom expansion plate.

In another preferred embodiment of the present invention, a television mounting system includes a wall mount, a monitor plate adapter coupled with the wall mount, and a permanent linkage coupling the monitor plate adapter with the wall mount, whereby the permanent linkage enables the monitor plate adapter to selectively move relative to the wall mount. The mounting system desirably includes at least one tightening element coupled with the permanent linkage, whereby the at least one tightening element is movable to a first position for enabling movement of the monitor plate adapter relative to the wall mount and is movable to a second position for preventing movement of the monitor plate adapter relative to the wall mount.

The permanent linkage desirably includes a combination articulating and tilting link having an articulating linkage and a tilting linkage. The at least one tightening element preferably includes a first tightening knob coupled with the articulating linkage and a second tightening knob coupled with the tilting linkage. The articulating linkage desirably includes a shaft permanently connecting the wall mount and the combination articulating and tilting link. The first tightening knob is desirably coupled with the shaft. The tilting linkage desirably includes a second shaft permanently connecting the monitor plate adapter and the combination articulating and tilting link. The second tightening knob is preferably coupled with the second shaft.

The system also desirably includes a monitor plate mountable on the monitor plate adapter. The monitor plate preferably comprises mounting flanges extending along sides thereof that engage mating flanges on the monitor plate adapter. The monitor plate desirably includes a flange extending along an upper end thereof, the flange having at least one opening adapted to receive a fastener for securing the monitor plate to the monitor plate adapter. The monitor plate adapter preferably has a support ledge extending adjacent a lower end thereof and the monitor plate sits on the support ledge when the monitor plate is mounted on the monitor plate adapter. In other preferred embodiments, the monitor plate may sit on and be supported by the upper end of the monitor plate adapter, and/or the lower end of the monitor plate adapter.

In one embodiment, the system includes at least one expansion plate securable to the monitor plate. The at least one expansion plate preferably includes a top expansion plate securable to the monitor plate using one or more hooks extending from the top expansion plate and a bottom expansion plate securable to the monitor plate using one or more hooks extending from the bottom expansion plate. The system preferably includes fasteners extending through openings in the top and bottom expansion plates for securing the expansion plates to the monitor plate. The expansion plates desirably cover an area that is larger than an area covered by the monitor plate. The expansion plates preferably include openings for securing the expansion plates to a television monitor.

In one preferred embodiment, the wall mount includes a channel formed therein and a tool is insertable into the channel for storing the tool with the wall mount. The wall mount may have a ledge disposed adjacent an end of the channel for holding the tool inside the wall mount. In one embodiment, the tool is an Allen wrench having a longer section insertable into the channel and a shorter section adapted to engage the shelf on the wall mount.

The mounting system may include an articulating arm having a first end permanently coupled with the articulating linkage and a second end remote from the first end. The system may also include a second articulating arm having a first end coupled with the second end of the first arm and a second end coupled with the wall mount. The first and second articulating arms are desirably permanently connected together by a shaft for providing selective articulating movement.

In another preferred embodiment of the present invention, a television mounting system includes a wall mount, a monitor plate adapter coupled with the wall mount, and a permanent linkage including an articulating arm for permanently coupling the monitor plate adapter with the wall mount for selectively moving the monitor plate adapter relative to the wall mount. The system preferably includes at least one tightening element coupled with the permanent linkage, whereby the at least one tightening element is movable to a first position for enabling movement of the monitor plate adapter relative to the wall mount and is movable to a second position for preventing movement of the monitor plate adapter relative to the wall mount. The permanent linkage desirably includes a second articulating arm for permanently coupling the monitor plate adapter with the wall mount, whereby the first and second articulating arms are permanently connected together.

In a preferred embodiment of the present invention, a television mounting system includes a wall mount, a monitor plate adapter coupled with the wall mount, and a permanent linkage coupling the monitor plate adapter with the wall mount for selectively moving the monitor plate adapter relative to the wall mount. The permanent linkage desirably includes a cable management system that is adapted for guiding cables between the wall mount and the monitor plate adapter. The permanent linkage preferably allows selective articulating and tilting movement of the monitor plate adapter relative to the wall mount. The system desirably includes at least one tightening element coupled with the permanent linkage, whereby the at least one tightening element is movable to a first position for allowing movement of the monitor plate adapter relative to the wall mount and is movable to a second position for fixing the position of the monitor plate adapter relative to the wall mount.

In one preferred embodiment, the cable management system desirably includes a first housing having a first channel for guiding a first cable and a second housing having a second channel for guiding a second cable, whereby the first and second channels are spaced from one another for minimizing signal interference between the first and second cables. The first and second cables may be selected from the group consisting of an audio cable, a video cable and a power cable. The system desirably includes a first cap securable over the first channel for containing the first cable in the first housing and a second cap securable over the second channel for containing the second cable in the second housing. The first housing desirably has a first side wall and a second side wall and the first channel preferably extends between the first and second side walls, the first and second side walls including aligned slots. Pins may be inserted into the aligned slots in the first and second side walls of the first housing. The first housing has a longitudinal axis and the inserted pins desirably extend in a direction that traverses the longitudinal axis. The pins are preferably engageable with the first cable for maintaining the first cable in the first channel of the first housing.

In one embodiment, the aligned slots have an L-shape, and the pins are advanced into a short leg of the L-shaped slot when seated in the aligned slots. The first cap may have an underside having fingers that are insertable into a long leg of the L-shaped slot for holding the pins in the short leg of the L-shaped slot. The first cap preferably forms a friction fit with the first housing.

The system may also include a second housing having a first side wall and a second side wall and the second channel extends between the first side wall and the second side wall. The first and second side walls of the second housing desirably include aligned slots. Pins are desirably insertable into the aligned slots in said first and second side walls of the second housing. The second housing has a longitudinal axis and the inserted pins preferably extend in a direction that traverses the longitudinal axis. The pins are engageable with the second cable for maintaining the second cable in the second channel of the second housing. The aligned slots of the second housing preferably have an L-shape, whereby the pins are advanced into a short leg of the L-shaped slot when seated in the aligned slots. The second cap preferably has an underside having fingers that are insertable into a long leg of the L-shaped slot for holding the pins in the short leg of the L-shaped slots of the second housing. The second cap desirably forms a friction fit with the second housing.

In certain preferred embodiments, the cable management system may have only one housing for directing/holding wires. In other embodiments, the cable management system may have one housing that holds wires and a second housing that does not hold wires.

The system may also include a monitor plate mountable on the monitor plate adapter. The monitor plate desirably includes mounting flanges extending along sides thereof that engage mating flanges on the monitor plate adapter. The monitor plate may include a flange extending along an upper end thereof, the flange having at least one opening adapted to receive a fastener for securing the monitor plate to the monitor plate adapter. The monitor plate adapter desirably has a support ledge extending adjacent a lower end thereof and the monitor plate sits on the support ledge when the monitor plate is mounted on the monitor plate adapter.

The television mounting system may also include at least one expansion plate securable to the monitor plate. The at least one expansion plate preferably includes a top expansion plate securable to the monitor plate using one or more hooks extending from the top expansion plate and a bottom expansion plate securable to the monitor plate using one or more hooks extending from the bottom expansion plate. Fasteners, such as screws, may extend through openings in the top and bottom expansion plates for securing the expansion plates to the monitor plate. The expansion plates desirably cover an area that is larger than an area covered by the monitor plate. The expansion plates include openings for securing the expansion plates to a television monitor.

The wall mount of the television mounting system may include a channel formed therein whereby a tool is insertable into the channel for storing the tool with the wall mount. The wall mount may also include a ledge disposed adjacent an end of the channel for holding the tool inside the wall mount. The tool may be an L-shaped instrument commonly referred to as an Allen wrench having a longer section insertable into the channel and a shorter section adapted to engage the shelf on the wall mount.

In still another preferred embodiment of the present invention, a television mounting system includes a wall mount, a monitor plate adapter coupled with the wall mount, and a linkage coupling the monitor plate adapter with the wall mount for selectively moving the monitor plate adapter relative to the wall mount, the permanent linkage including a cable management system that is adapted for guiding cables between the wall mount and the monitor plate adapter. The linkage desirably allows selective articulating and tilting movement of the monitor plate adapter relative to the wall mount. The cable management system preferably includes a first housing having a first channel for guiding a first cable and a second housing having a second channel for guiding a second cable, whereby the first and second channels are spaced from one another for minimizing signal interference between the first and second cables. The first and second cables may include an audio cable, a video cable or a power cable.

A first cap is desirably securable over the first channel for containing the first cable in the first housing and a second cap is securable over the second channel for containing the second cable in the second housing. The first housing preferably has a first side wall and a second side wall and the first channel extends between the first and second side walls, the first and second side walls including aligned openings extending therethrough. Pins are desirably insertable into the aligned openings in the first and second side walls of the first housing. The first housing has a longitudinal axis and the pins are desirably inserted in the aligned openings in a direction that traverses the longitudinal axis. The pins are preferably engageable with the first cable for maintaining the first cable in the first channel of the first housing. The first cap desirably forms a friction fit with the first housing.

The system also desirably includes the second housing having a first side wall and a second side wall with the second channel extending between the first side wall and the second side wall, the first and second side walls of the second housing including aligned openings. Pins are preferably insertable into the aligned openings in the first and second side walls of the second housing. The second housing has a longitudinal axis and the inserted pins preferably extend in a direction that traverses the longitudinal axis. The pins are desirably engageable with the second cable for maintaining the second cable in the second channel of the second housing. The second cap desirably forms a friction fit with the second housing.

These and other preferred embodiments of the present invention will be described in more detail below.

BRIEF DESCRIPTION OF THE DRAWINGS

FIGS. 4A-4F show the wall plate and the monitor plate of FIG. 3 assembled together.

FIGS. 11A-11F show the tiltable mount of FIGS. 10A-10B after assembly.

FIGS. 17A-17F show other views of the tilt and pan mount of FIG. 15A.

FIG. 26 shows a rear view of a wall mount of the tilt, pan and articulating mount shown in FIG. 24.

FIG. 27 shows a cross sectional view of the tilt, pan and articulating mount shown in FIG. 25.

DETAILED DESCRIPTION

Figure 1A:
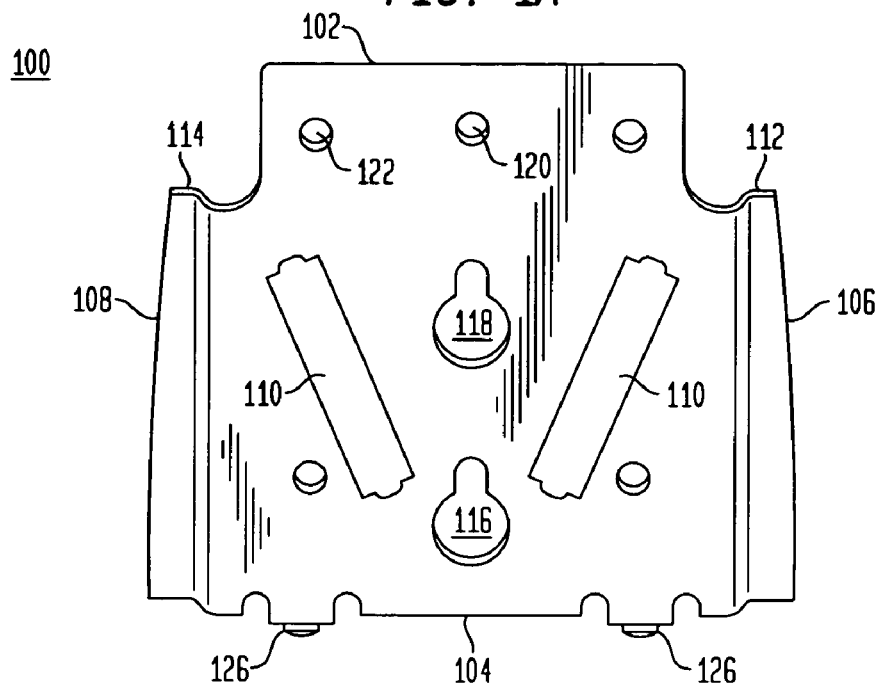
FIGS. 1A-1C show a wall plate for a television mounting system, in accordance with certain preferred embodiments of the present invention.

Referring to FIG. 1A, in accordance with certain preferred embodiments of the present invention, a wall plate 100 for a television mounting system includes an upper end 102, a lower end 104, a first side 106 and a second side 108. The wall plate if preferably made of a rigid material such as metal. The wall plate 100 includes ribs 110 formed therein. The ribs strengthen the wall plate and prevent the sides 106, 108 of the wall plate from collapsing or bending toward one another when a load is applied to the wall plate.

Figure 1B:
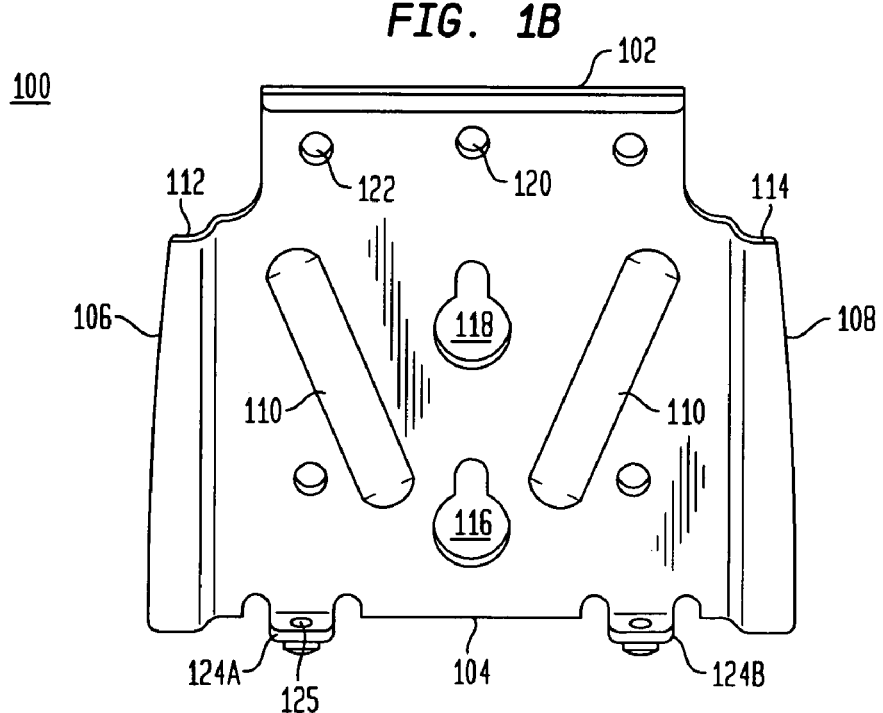
Figure 1C:
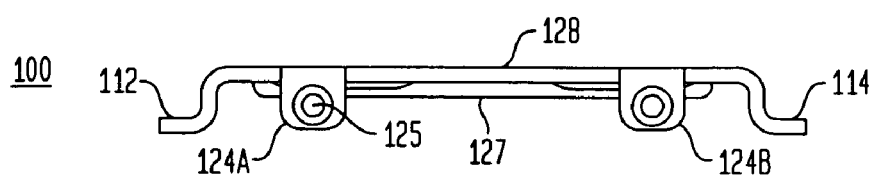

Referring to FIGS. 1A-1C, the wall plate includes a first mating flange 112 provided adjacent the first side 106 of wall plate 100. The wall plate 100 also includes a second mating flange 114 provided adjacent the second side 108 of the wall plate. In preferred embodiments, the mating flanges 112, 114 are curved for adding strength to the flanges. The mating flanges 112, 114 preferably extend between the upper end 102 and the lower end 104 of the wall plate. As will be described in more detail below, the mating flanges 112, 114 mesh with mounting flanges on a monitor plate for forming a section of a television mounting system.

Referring to FIGS. 1A and 1B, the wall plate includes a first keyhole opening 116 and a second keyhole opening 118. After securing elements such as screws have been anchored in a wall, the first and second keyhole openings 116, 118 may be used for securing the wall plate to a wall. The wall plate 100 also includes a circular opening 120 that is aligned with the first and second keyhole openings 116, 118. The circular opening 120 is smaller than the keyhole openings 116, 118 and is adapted to receive a fastener such as a screw for mounting the wall plate to a wall. The circular opening 120 is smaller than the keyhole openings so that it can better withstand stresses that are typically present at upper ends of base plates or mounting plates. The wall plate 100 also includes supplemental openings 122 that may also be used for anchoring the wall plate to a wall or a surface.

FIG. 1A shows the surface of the wall plate 100 that is abutted against a wall, with the ribs 110 projecting away from the wall so that the wall plate may be placed flush with the wall. FIG. 1B shows the face of the wall plate 100 that faces away from the wall with the ribs 110 projecting away from the wall.

Figure 3:
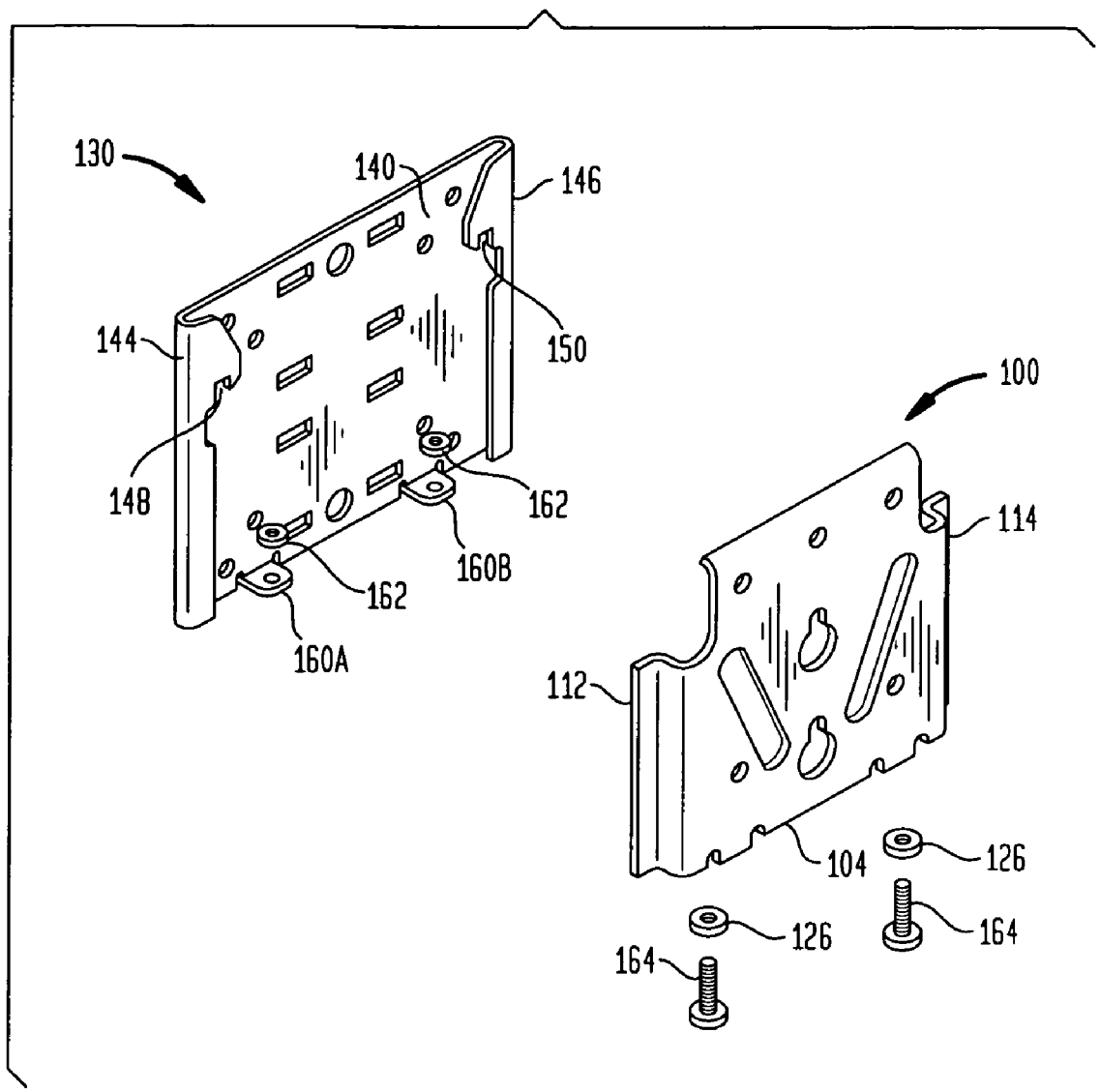
FIG. 3 shows the wall plate of FIG. 1A juxtaposed with the monitor plate of FIG. 2A.

Referring to FIGS. 1B and 1C, the wall plate includes a pair of L-shaped flanges 124A, 124B that project from the lower end 104 of the wall plate. The flanges 124A, 124B include central openings 125 that are adapted to receive threaded inserts 126 that are press fit into the openings 125. The threaded inserts 126, which are shown in FIGS. 1A and 3, are adapted to receive threaded fasteners 164, such as screws, bolts or the like (see FIG. 3).

Figure 2A:
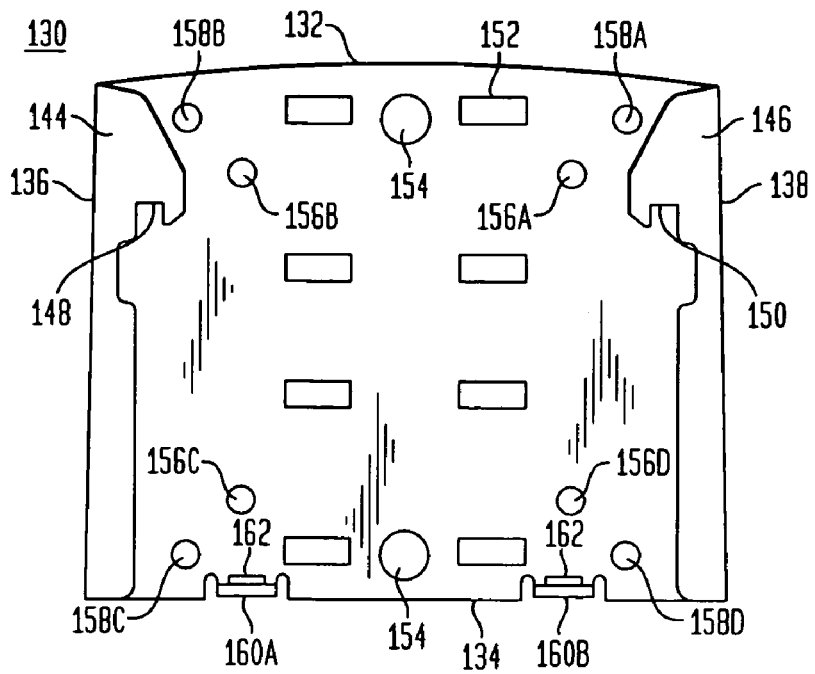
FIGS. 2A-2C show a monitor plate for a television mounting system, in accordance with certain preferred embodiments of the present invention.
Figure 2B:
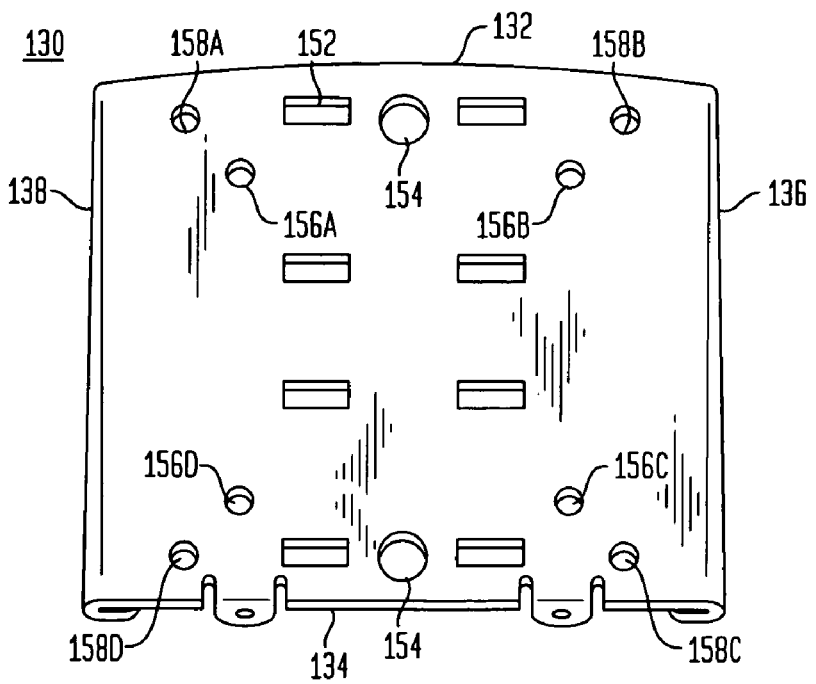
Figure 2C:
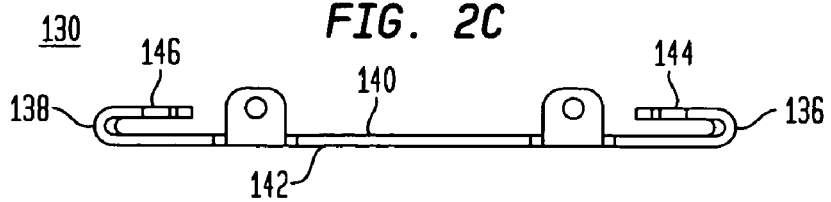

Referring to FIGS. 2A-2C, in certain preferred embodiments of the present invention, a television mounting system includes a monitor plate 130 having an upper end 132, a lower end 134, a first side 136 and a second side 138. Referring to FIG. 2C, the monitor plate 130 includes an inner face 140 that opposes the wall plate shown in FIGS. 1A-1C and an outer face 142 that normally opposes the back or rear of a television monitor.

Referring to FIGS. 2A-2C, the monitor plate 130 includes a first mounting flange 144 extending along the first side 136 of the monitor plate and a second mounting flange 146 extending along the second side 138 of the mounting plate. As shown in FIG. 2A, the first mounting flange 144 includes a first hook 148 and the second mount flange 146 includes a second hook 150. The first and second hooks 148, 150 are adapted to engage upper ends of the mating flanges 112, 114 of the wall plate 100 shown in FIG. 1B.

Referring to FIGS. 2A and 2B, the monitor plate 130 includes a series of expansion plate openings 152 extending therethrough. As will be described in more detail below, the expansion plate openings 152 enable the expansion plates (not shown) to be attached to the monitor plate. The monitor plate 130 also includes supplemental expansion plate openings 154 that may also be used for attaching the expansion plates to the monitor plate. The monitor plate 130 also includes an inner set of television mounting openings 156A-156D that are used for mounting a television monitor to the monitor plate 130. In certain preferred embodiments, fasteners such as screws are passed through the inner set of television mounting openings 156-156D and into threaded openings located at the rear of a television monitor. In certain preferred embodiments, the inner set of television mounting openings 156A-156D are used for providing a 75 mm by 75 mm mounting pattern.

Referring to FIGS. 2A and 2B, the mounting plate 130 also includes an outer set of television mounting openings 158A-158D that are used for mounting a larger sized television monitor to the mounting plate. In one particular preferred embodiment, the outer set of television mounting openings 158A-158D are used for a 100 by 100 mm mounting pattern.

Referring to FIG. 2A, the monitor plate 130 includes L-shaped flanges 160A, 160B that project from the lower end 134 of the monitor plate 130. Threaded inserts 162 are desirably press fit into the openings in the L-shaped flanges 160A, 160B. As will be described in more detail below, the L-shaped flanges 160A, 160B are used for connecting the monitor plate 130 to the wall plate 100 shown in FIGS. 1A-1C.

FIG. 3 shows the wall plate 100 of FIGS. 1A-1C being juxtaposed with the monitor plate 130 of FIGS. 2A-2C. Before assembling the wall plate 100 and the monitor plate 130 together, the inner face 127 (shown in FIG. 1C) of the wall plate 100 is juxtaposed with the inner face 140 of the monitor plate. The first and second mounting flanges 144, 146 on the monitor plate 130 are coupled with upper ends of the mating flanges 112, 114 of the wall plate. After the mounting flanges are coupled with the mating flanges, the monitor plate is slid toward the lower end 104 of the wall plate until the hooks 148, 150 on the monitor plate engage the upper ends of the mating flanges 112, 114. After the hooks 148, 150 are firmly seated on the upper ends of the mating flanges 112, 114, threaded fasteners 164 may be passed through the threaded inserts press fit into the L-shaped flanges on the respective wall plate 100 and monitor plate 130. In certain preferred embodiments, the threaded fasteners 164 may be at least partially coupled with the threaded inserts on the L-shaped flanges of the wall plate 100 before the monitor plate 130 is assembled with the wall plate. As a result, the threaded fasteners will be pre-aligned with the openings in the threaded inserts once the monitor plate is coupled with the wall plate. In this particular embodiment, the threaded fasteners may be fully tightened after the wall plate 100 and the monitor plate 130 are coupled together for securing the wall plate 100 and the monitor 130 to one another.

FIGS. 4A-4F show the monitor plate 130 assembled with the wall plate 100. As shown in FIGS. 4E and 4F, the upper end 102 of the wall plate 100 includes a top flange 166 that adds strength to the upper end of the wall plate and prevents the wall plate from bending forward under load. As shown in FIGS. 4C and 4D, the mating flanges 112 on the wall plate 100 are captured within the mounting flanges 144, 146 on the monitor plate 130. Referring to FIG. 4B, the first and second hooks 148, 150 on the monitor plate engage the upper ends of the mating flanges 112, 114 on the wall plate 100.

Figure 5A:
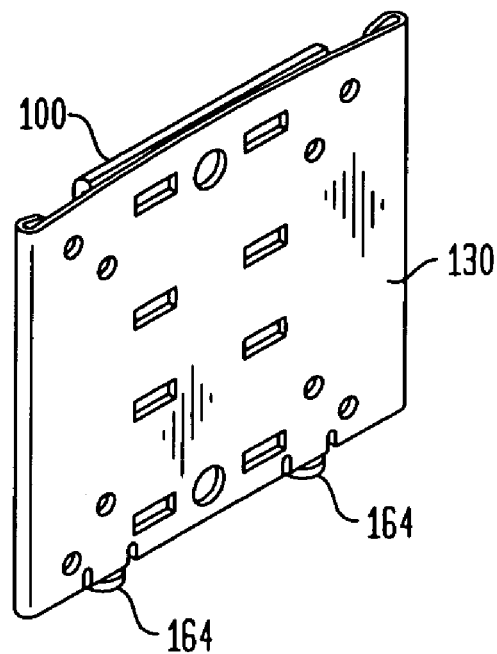
FIGS. 5A and 5B show the wall plate and the monitor plate of FIG. 3 assembled together.
Figure 5B:
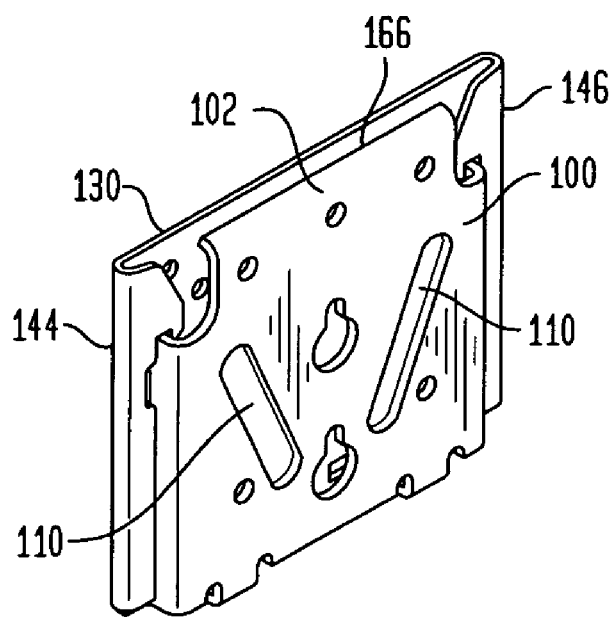

FIG. 5A shows monitor plate 130 assembled with wall plate 100. Threaded fasteners 164 extend through the threaded inserts press fit into the L-shaped flanges of the respective wall plate and monitor plate for securing the wall plate and monitor together. FIG. 5B shows the assembly of FIG. 5A with reinforcing ribs 110 being provided on the wall plate 100. The reinforcing ribs 110 provide strength to the wall plate under load. The upper end 102 of the wall plate includes a top flange 166 that also provides strength to the wall plate under load. The projecting ribs 110 and the top flange 166 prevent the wall plate 100 from bending or folding under load. As a result, the ribs 110 and the top flange 166 enable the wall plate to carry more weight than is possible with prior art mounting systems.

Although the present invention is not limited by any particular theory of operation, it is believed that providing mounting flanges 144 and 146 on the monitor plate 130 that couple with mating flanges of the wall plate enables the assembly of the wall plate 110 and the monitor plate 130 to carry additional load. This is because the hooks 148, 150 on the monitor plates 130 engage the upper ends of the mating flanges on the wall plate 100. Further structural support is provided by the L-shaped flanges of the respective wall plate and monitor plate that are connected together by passing a threaded fastener through the threaded inserts positioned on the L-shaped flanges.

Figure 6A:
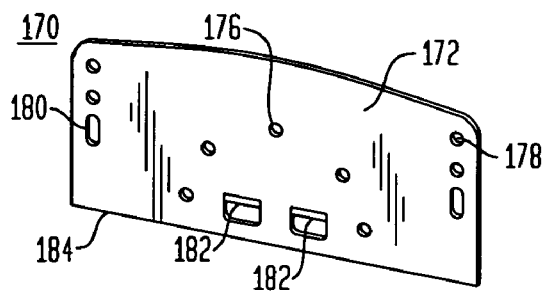
FIGS. 6A and 6B show a top expansion plate for a television mounting system, in accordance with certain preferred embodiments of the present invention.
Figure 6B:
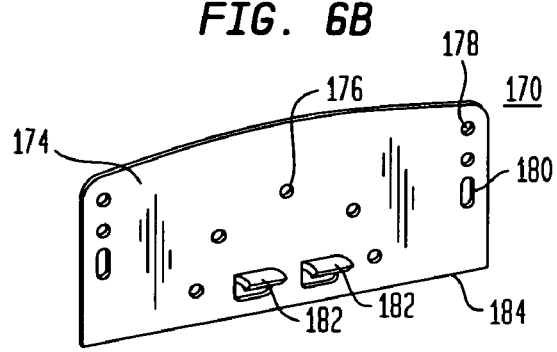

Referring to FIGS. 6A and 6B, in one preferred embodiment of the present invention, a television mounting system includes a top expansion plate 170 having a first face 172 that normally faces the back of a television monitor and a second face 174 that normally faces a monitor plate, such as the monitor plate shown and described above in FIGS. 2A-2C. The top expansion plate 170 includes openings 176 that receive fasteners such as screws for securing the top expansion plate to the monitor plate. The top expansion plate 170 shown in FIGS. 6A and 6B has five openings 176 that are arranged in a particular configuration. One or more of the openings 176 may be utilized depending upon the size of the television monitor secured to the top expansion plate. The top expansion plate 170 also includes supplemental openings 178 that are also used for securing a television monitor to the top expansion plate. In certain preferred embodiments, the supplemental openings 178 enable a larger sized television monitor to be secured to the top expansion plate. One or more of the openings 176, 178 may include an elongated or slotted opening 180 which provides flexibility for securing a television monitor to the top expansion plate. This may be useful in instances where a circular opening does not exactly align with a mounting opening on a television monitor.

As shown in FIGS. 6A and 6B, the top expansion plate 170 also includes hooks 182 that project from the second face 174 of the top expansion plate 170 and extend toward a lower end 184 of the top expansion plate. As will be described in more detail below, the hooks 182 preferably fit in the expansion plate openings 152 (FIG. 2A) of the monitor plate for providing enhanced weight bearing support for the top expansion plate.

Figure 7A:
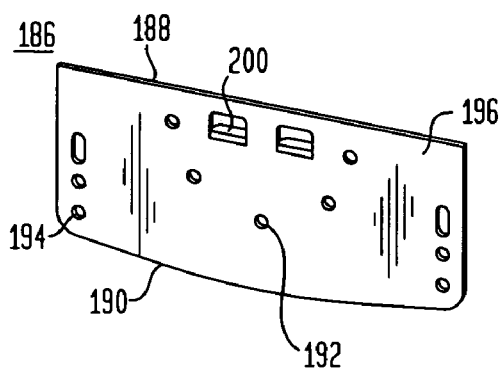
FIGS. 7A and 7B show a bottom expansion plate of a television mounting system, in accordance with certain preferred embodiments of the present invention.
Figure 7B:
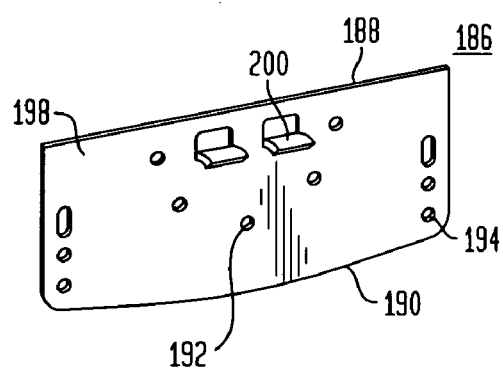

Referring to FIGS. 7A and 7B, in certain preferred embodiments, the television mounting system also preferably includes a bottom expansion plate 186 including an upper end 188 and a lower end 190. The bottom expansion plate 186 includes first openings 192 that are adapted to receive fasteners such as screws for securing the bottom expansion plate 186 to the rear of a television monitor. Fasteners may be passed through one or more of the first openings 192 depending upon the size of the television monitor and/or the mounting pattern on the rear of the television monitor. The bottom expansion plate 186 also includes second openings 194 which may be utilized for larger configurations and/or larger television monitors. Bottom expansion plate 186 has a first face 196 that confronts the back of the television monitor and a second face 198 that confronts the monitor plate when attached thereto. The bottom expansion plate 186 also preferably includes hooks 200 that project from the second face 198 and extend toward the lower end 190 thereof. The hooks 200 are preferably inserted into the expansion plate openings 152 (FIG. 2A) on the monitor plate for enhancing the load bearing capabilities of the bottom expansion plate.

Figure 8A:
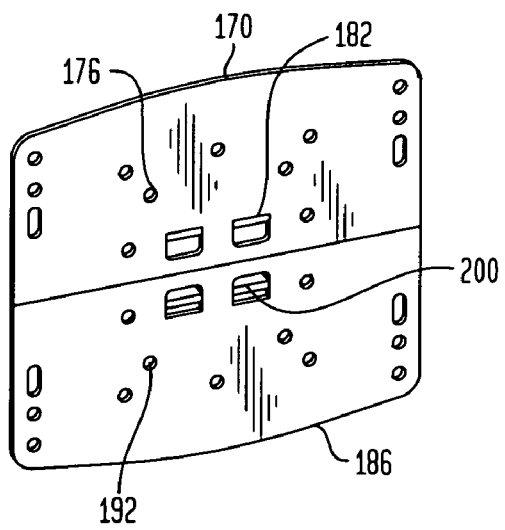
FIG. 8A shows the top and bottom expansion plates of FIGS. 6A and 7A assembled with the monitor plate of FIGS. 2A-2C.

FIG. 8A shows the top expansion plate 170 and the bottom expansion plate 186 secured to the monitor plate 130 (FIG. 5A). Although not shown, fasteners are inserted into the openings 176, 192 of the expansion plates for securing the expansion plates to the monitor plate. In addition, the hooks 182, 200 fit into the expansion plate openings in the monitor plate for supporting the expansion plate and enhancing the load bearing capabilities of the expansion plates. In FIG. 8A, the top and bottom expansion plates 170, 186 are attached to the monitor plate in a first configuration. In one particular preferred embodiment, the attachment of the top and bottom expansion plates to the monitor plate provides a 200×100 mm configuration for supporting a television monitor having that particular size. However, different openings on the top and bottom expansion plates 170, 186 may be used for supporting television monitors having a different (e.g., larger) sizes.

Figure 8B:
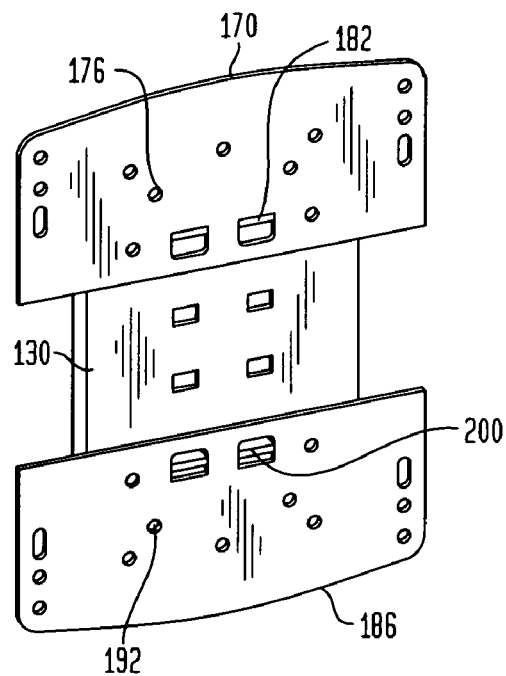
FIG. 8B shows a front view of the top and bottom expansion plates of FIG. 8A in an expanded configuration.

FIG. 8B shows the top and bottom expansion plates 170, 186 secured to the monitor plate 130 in an expanded configuration. The hooks 182, 200 are inserted into a different set of openings closer to the upper and the lower end of the monitor plate. One or more fasteners are passed through the openings 176, 192 in the expansion plates for securing the expansion plates to the monitor plate.

Figure 8C:
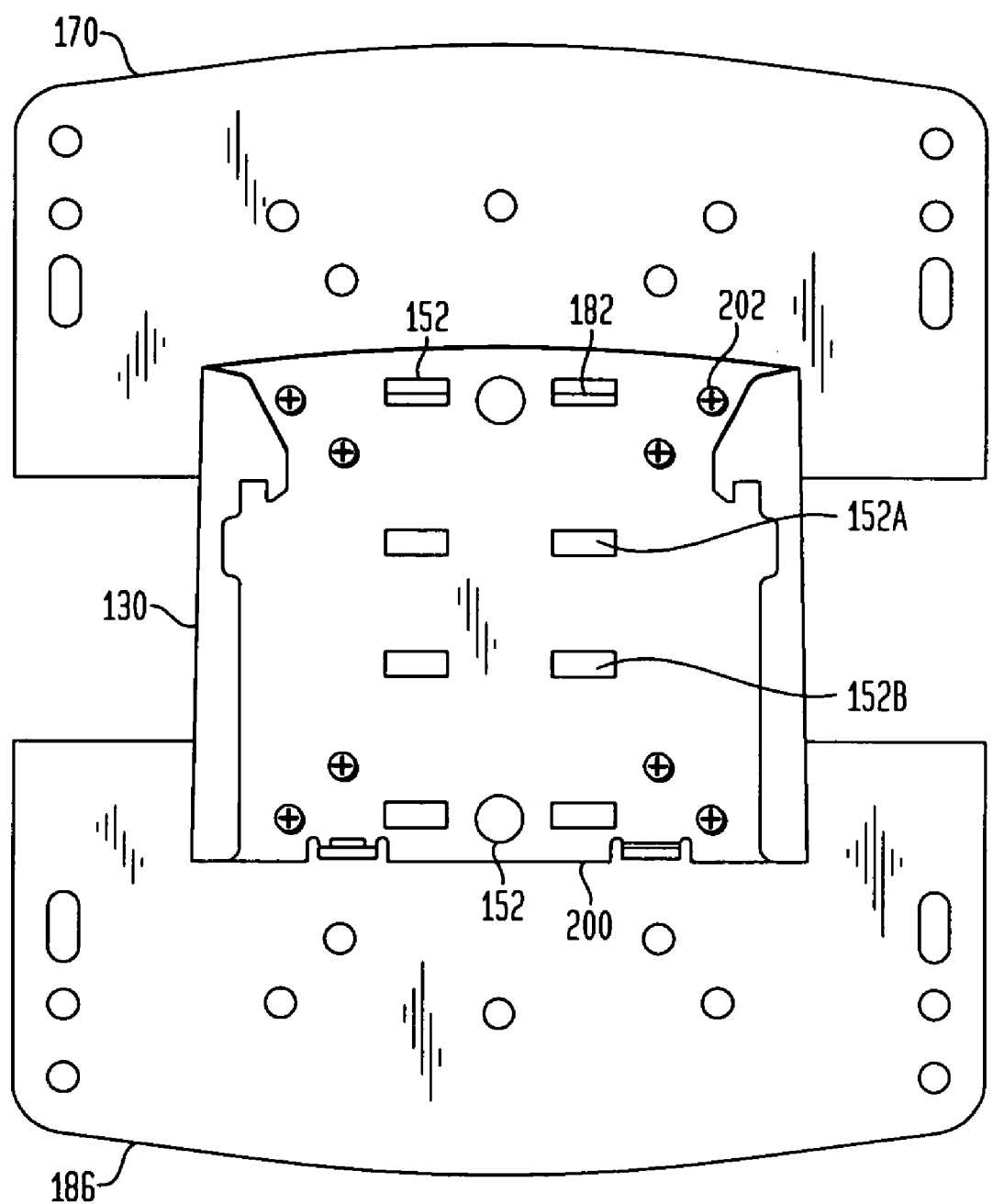
FIG. 8C shows a rear view of FIG. 8B.

FIG. 8C shows a rear side view of the top and bottom expansion plates 170, 186 attached to the monitor plate 130. The hooks 182 on the top expansion plate 170 extend through expansion plate openings 152 in the monitor plate 130 for supporting the top expansion plate 170. The hooks 200 on the bottom expansion plate 186 extend through other expansion plate openings 152 on the monitor plate 130 for supporting the bottom expansion plate. Fasteners 202 such as screws extend through openings in the monitor plate 130 and openings in the respective top and bottom expansion plates 170, 186 for securing the expansion plates to the monitor plates. Locking nuts may be coupled with the hooks. More or less fasteners 202 than shown in FIG. 8C may be utilizing for securing the expansion plates to the monitor plates. In FIG. 8C the top and bottom expansion plates are secured to the monitor plate in an expanded configuration. If a smaller configuration such as the configuration shown in FIG. 8A is desired, the hooks 182, 200 of the respective expansion plates are secured in the centrally located expansion plate openings 152A, 152B on the monitor plate 130.

Figure 9A:
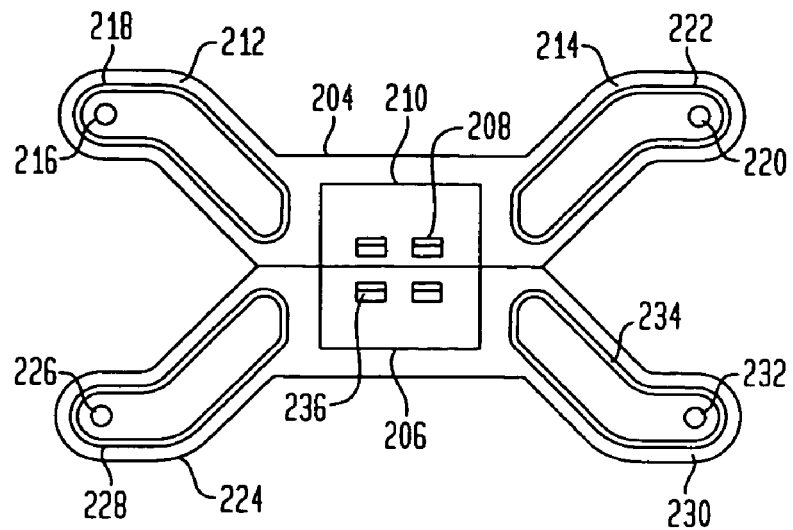
FIGS. 9A-9B show a top large expansion plate and a bottom large expansion plate attached to a monitor plate, in accordance with certain preferred embodiments of the present invention.
Figure 9B:
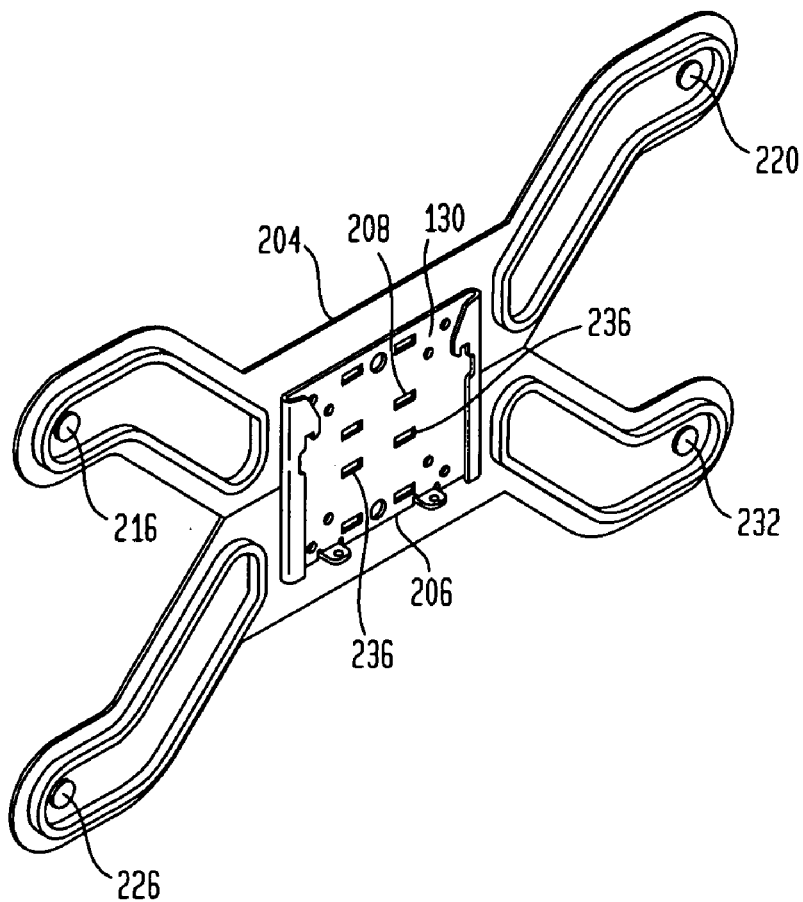

Referring to FIGS. 9A-9C, in accordance with certain preferred embodiments of the present invention, a large top expansion plate 204 and a large bottom expansion plate 206 may be secured to the monitor plate 130 shown and described above in FIGS. 2A-2C. Referring to FIG. 9A, the large top expansion plate 204 includes hooks 208 located in a central, monitor plate mounting area 210. The hooks 208 are adapted to pass through expansion plate openings in the monitor plate for securing the large top expansion plate 204 to the monitor plate. The large top expansion plate 204 also includes a first arm 212 and a second arm 214 extending from the central, monitor plate mounting area 210. The first arm 212 includes at least one opening 216 through which a fastener may be passed for securing a television monitor to the first arm 212. The first arm 212 also includes a rib 218 that extends around the opening 216 and inwardly to an area adjacent to the central, monitor plate mounting area 210. Although the present invention is not limited by any particular theory of operation, it is believed that the rib 218 enhances the strength of the first arm 212 at certain stress points such as stress points located around the opening 216 and in the area around the central, monitor plate mounting area 210. Laboratory studies have shown that some of the greatest load stresses occur around the opening 216 and in the area where the arm 212 extends to the central, monitor plate mounting area 210. Thus, providing a rib 218 on the arm 212 will strengthen the arm and provide a reliable structure for handling the stresses under load.

The second arm 212 of the large top expansion plate 204 has one or more openings 220 for receiving a fastener for fastening a television monitor to the second arm 214. Second arm 214 also includes a rib 222 similar to the rib 218. Rib 222 also enhances the strength of the second arm as described above with respect to the rib on the first arm 212.

The assembly shown in FIG. 9A also includes the large bottom expansion plate 206 including first arm 224 having at least one opening 226 for receiving a fastener and a rib 228. The large bottom expansion plate 206 also includes a second arm 230 having one or more opening 232 and a rib 234. The large bottom expansion plate 206 also includes hooks 236 that pass through openings in the monitor plate for supporting the large bottom expansion plate on the monitor plate.

Referring to FIG. 9B, when the large top expansion plate 204 is assembled with the monitor plate 130, the hooks 208 on the large top expansion plate pass through some of the expansion plate openings in the monitor plate 130. Similarly, when the large bottom expansion plate 206 is assembled with the monitor plate 130, the hooks 236 on the large bottom expansion plate pass through some of the openings in the monitor plate 130. Preferably, openings 216, 220, 226 and 232 on the respective large top and bottom expansion plates are aligned with openings on a television monitor. Fasteners may pass through the openings 216, 220, 226 and 232 for securing the respective large top and bottom expansion plates to a television monitor. After the expansion plates are secured to the television, the television, the top and bottom expansion plates 204, 206 and the monitor plate 130 secured thereto may be attached to a wall plate similar to the wall plate shown and described above in FIGS. 1A-1C.

Figure 10A:
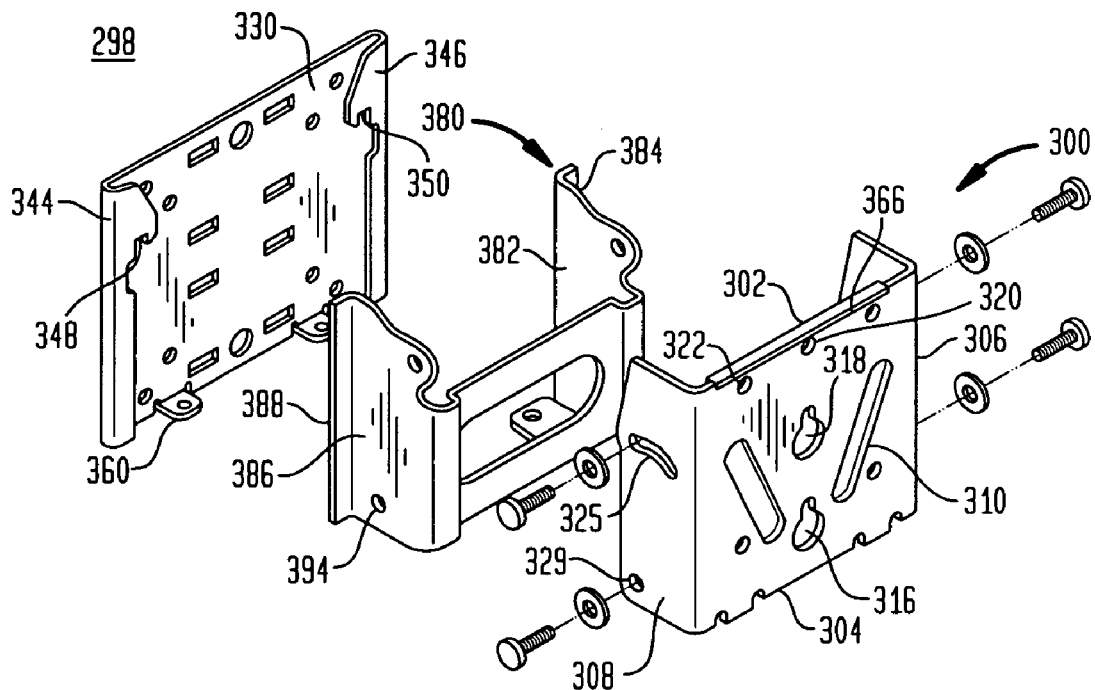
FIGS. 10A-10B show an exploded view of a tiltable mount for a television mounting system, in accordance with certain preferred embodiments of the present invention.
Figure 10B:
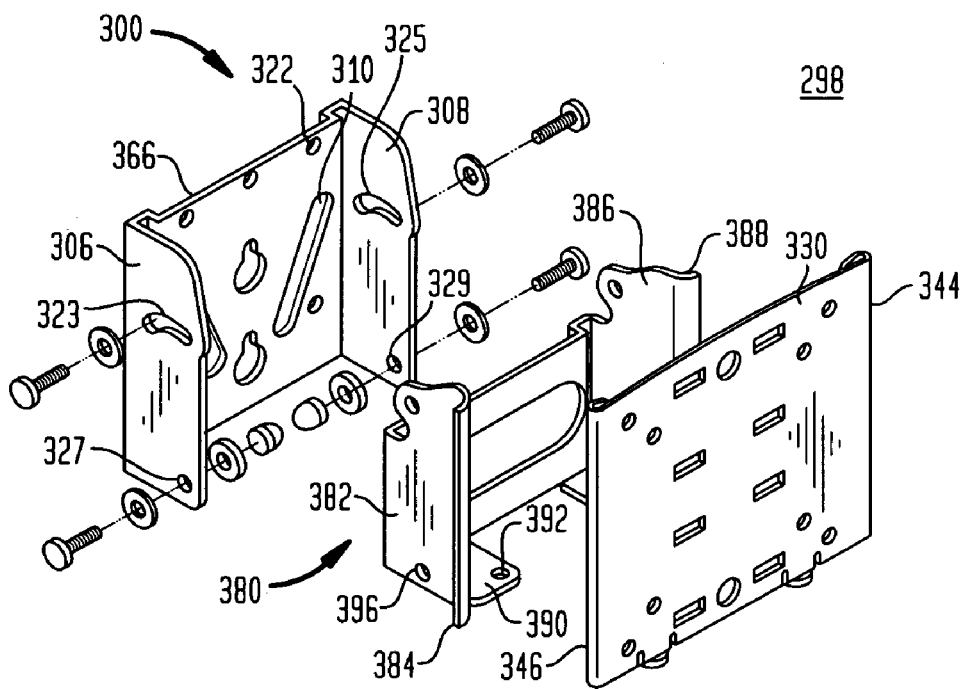

Referring to FIGS. 10A and 10B, in certain preferred embodiments of the present invention, a television mounting system includes a tiltable mount 298 having a wall plate 300 with an upper end 302, a lower end 304, a first side 306 and a second side 308. The wall plate 300 includes ribs 310 formed therein that enhance the strength of the wall plate under load. Wall plate 300 also includes a top flange 366 that further enhances the strength of the wall plate under load. The wall plate 300 includes opening similar to the openings shown and described above in the embodiment shown in FIGS. 1A-1C. Referring to FIG. 10A, the wall plate 300 includes a first keyhole opening 316 and a second keyhole opening 318. After fasteners are secured to a wall, the first and second keyhole openings 316, 318 may be used for mounting the wall plate 300 to the wall. The wall plate 300 also includes an additional opening 320 aligned with the first and second keyhole openings. The additional opening 320 also receives a fastener for mounting the wall plate 300 to a wall.

Referring to FIGS. 10A and 10B, the wall plate 300 also includes supplemental openings 322 that may also be used for mounting the wall plate 300 to a wall. Although a particular pattern of supplemental openings 322 is shown, the pattern may be modified and include more or less than the number of openings shown in the drawing figures.

The first side 306 of the wall plate 300 includes an elongated slot 323. Similarly, the second side 308 of the wall plate 300 includes an elongated slot 325. As will be described in more detail below, the elongated slots 323, 325 enable a tilting mechanism to slide along the slots 323, 325 to enable the tilting mechanism to tilt relative to the wall plate 300.

Referring to FIGS. 10A-10B, the television mounting system also includes a monitor plate 330 that is preferably similar to the monitor plate shown and described above in FIGS. 2A-2C. The tilting mount 298 also preferably includes a tilt mechanism 380 including a first side 382 having a first mating flange 384 and a second side 386 having a second mating flange 388. The mounting flanges 344, 346 on the monitor plate 330 are slideable over the mating flanges 384, 388 on the tilt mechanism 380. The hooks 348, 350 on the mounting flanges preferably engage upper ends of the mating flanges 384, 388 on the tilt mechanism 380 for coupling the monitor plate 330 with the tilt mechanism 380.

Referring to FIG. 10A, the lower end of the monitor plate 330 includes L-shaped flanges 360 that are preferably aligned with opposing flanges 390 on the tilt mechanism 380. The flanges 390 include one or more openings 392 that are preferably aligned with the openings on the L-shaped flanges 360 of the monitor plate. Fasteners may be passed through the openings for securing the L-shaped flanges 360 of the monitor plate 330 with the flanges 390 of the tilt mechanism 380.

The tilt mechanism 380 is assembled with the wall plate 300 by aligning openings 327, 329 at the respective first and second sides 306, 308 of the wall plate 300 with openings 394, 396 formed in the sides of the tilt mechanism. Thus, opening 327 of the wall plate is aligned with opening 396 of the tilt mechanism, and opening 329 of the wall plate is aligned with opening 394 of the tilt mechanism. A first fastener may be passed through the aligned openings 327 and 396 and a second fastener may be passed through the aligned openings 329 and 394. Similarly, the openings at an upper end of the tilt mechanism may be aligned with the slots 323, 325 in the wall plate 300. Fasteners may also be passed through these aligned openings. The elongated slots 323, 325 enable the tilt mechanism 380 to tilt relative to the wall plate.

In order to mount a television monitor to a wall, the wall plate 300 is first secured to a wall as described above. The tilt mechanism 380 is then assembled with the wall plate 300. As noted above, due to the elongated slots 323, 325 provided in a wall plate, the tilt mechanism 380 is able to tilt relative to the wall plate 300. The monitor plate 330 is then attached to the rear surface of a television monitor by passing fasteners through one or more openings of the monitor plate and into mounting holes in the television monitor. After the monitor plate is attached to the television monitor, the television monitor and the attached monitor plate are coupled with the tilt mechanism 380 by sliding the mounting flanges 344, 346 of the monitor plate over the mating flanges 384, 388 of the tilt mechanism.

FIGS. 11A-11F show the tilt mount 298, after the monitor plate 330 has been coupled with the wall plate 300. The upper fasteners 335, when untightened, are able to slide within slots 323, 325. This enables the monitor plate 330 and the tilt mechanism 380 to tilt relative to the wall plate 300. When a preferred angle of tilt has been obtained, the upper fasteners 335 may be tightened for securing the monitor plate 330 at a preferred angle or orientation relative to the wall plate. Lower fasteners 337 may also be loosened and tightened for selectively enabling the monitor plate 330 to be tilted and secured in a preferred orientation.

Figure 12A:
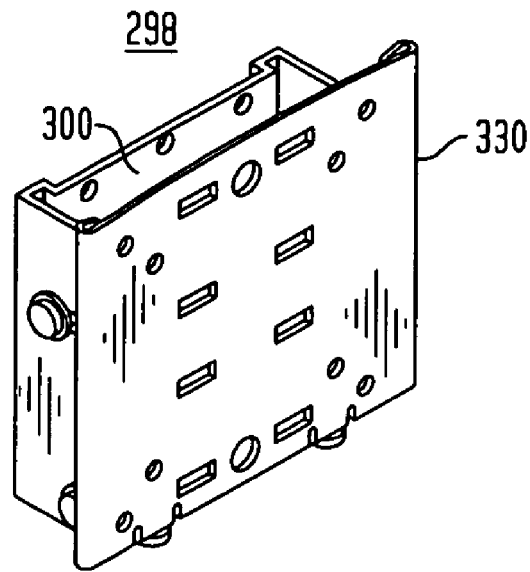
FIG. 12A shows a front perspective view of the tiltable mount shown in FIG. 11A.
Figure 12B:
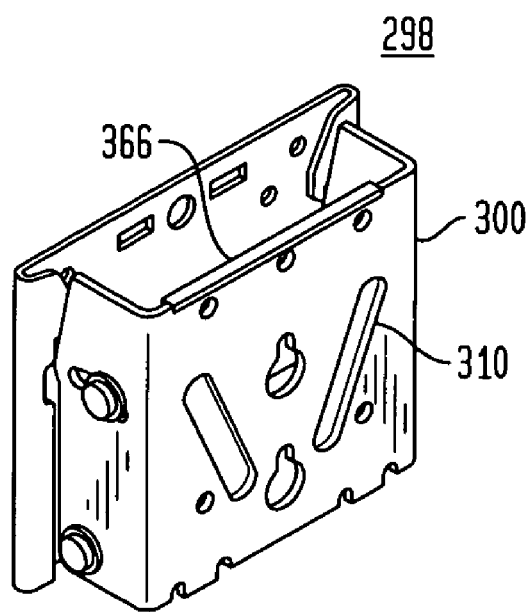
FIG. 12B shows a rear perspective view of the tiltable mount shown in FIG. 11B.

FIG. 12A shows a front perspective view of the tilt mount 298. Although not shown, in preferred embodiments, a television monitor is attached to the monitor plate 330 prior to attachment of the monitor plate to the tilt mechanism (not shown) and the wall plate 300. FIG. 12B shows a rear perspective view of the tilt mount 298 including wall plate 300 that is preferably attached to a wall. As noted above, the wall plate 300 includes one or more ribs 310 and a top flange 366 extending along an edge of the wall plate 300. The ribs 310 and the top flange 366 enhance the strength of the wall plate.

Figure 13:
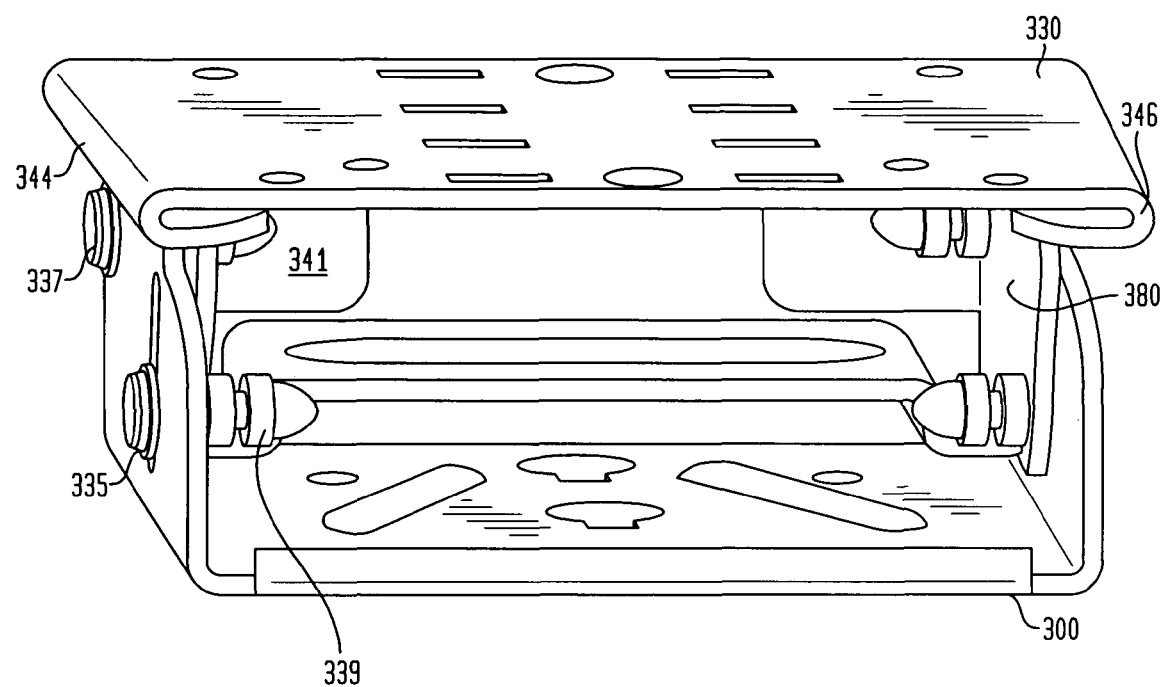
FIG. 13 shows a top perspective view of the tiltable mount shown in FIG. 12A.

FIG. 13 shows a top perspective view of the tilt mount 298 shown in FIGS. 11A-11F and 12-12B. The tilt mount 298 includes wall plate 300, tilt mechanism 380 and monitor plate 330 coupled with tilt mechanism 380. The tilt mount 298 includes upper fasteners 335 that pass through the slots (not shown) in the sides of the wall plate 300. In one embodiments, the inner ends of the fasteners include fixed nuts 339 secured thereto that cannot be removed from the inner ends of the upper fasteners 335. This structure creates a permanent unbreakable linkage between the wall plate 300 and the tilt mechanism 380. Similarly, the lower fasteners 337 may also include fixed nuts 341 secured to inner ends thereof, which form a permanent, unbreakable connection between the tilt mechanism 380 and the wall plate 300. The fixed nuts 339, 341 prevent unintentional disassembly of the tilt mount 298 so that the structure will not collapse by loosening the upper and lower fasteners 335, 337. Without the fixed nuts 339, 341, it may be possible for an individual to loosen fasteners, which could result in the mounting system collapsing and a television monitor crashing to the floor. Thus, the fixed nuts 339, 341 provide a reliable mechanism for preventing accidental damage to a television monitor. In other embodiments, the fixed nuts may be replaced by a C-clip provided over the end of the fastener so as to prevent unintentional disassembly of the tilt mount. A permanent unbreakable linkage may also be created by deforming the inner ends of the fasteners so that the fasteners may not be removed. In other embodiments, any type of fastening element may be used that makes disassembly of the tilting mechanism from the wall plate very difficult or nearly impossible.

As shown in FIG. 13, the openings of the L-shaped flanges on the monitor plate 330 are aligned with the openings on the flanges on the tilt mechanism 380. Fasteners such as screws may be passed through the aligned openings for securing the monitor plate 330 to the tilt mechanism 380. Threaded inserts may be press fit into the opening in the flanges and used for pre-aligning the fasteners with the openings in the flanges. In addition, the mating flanges on the tilt mechanism 380 are captured within the mounting flanges 344, 346 on the monitor plate 330.

Figure 14A:
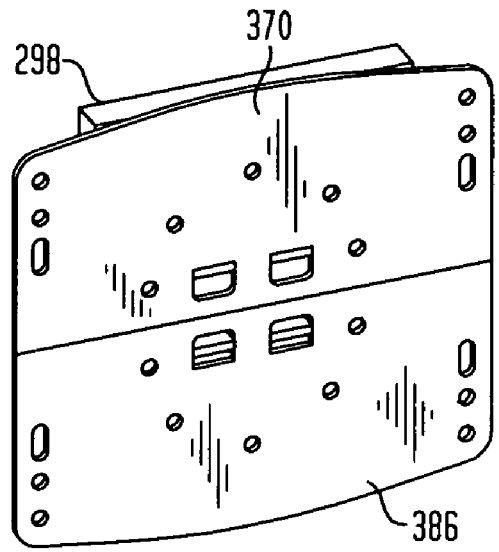
FIG. 14A shows the top and bottom expansion plates of FIGS. 6A and 7A attached to the tiltable mount shown in FIG. 12A.

FIG. 14A shows a top expansion plate 370 and a bottom expansion plate 386 secured to a monitor plate of the tilt mechanism shown in FIGS. 12A-12B. In FIG. 14A, the top and bottom expansion plates 370, 386 are attached to the tilt mount 298 in a first configuration that may be a 200×100 mm configuration.

Figure 14B:
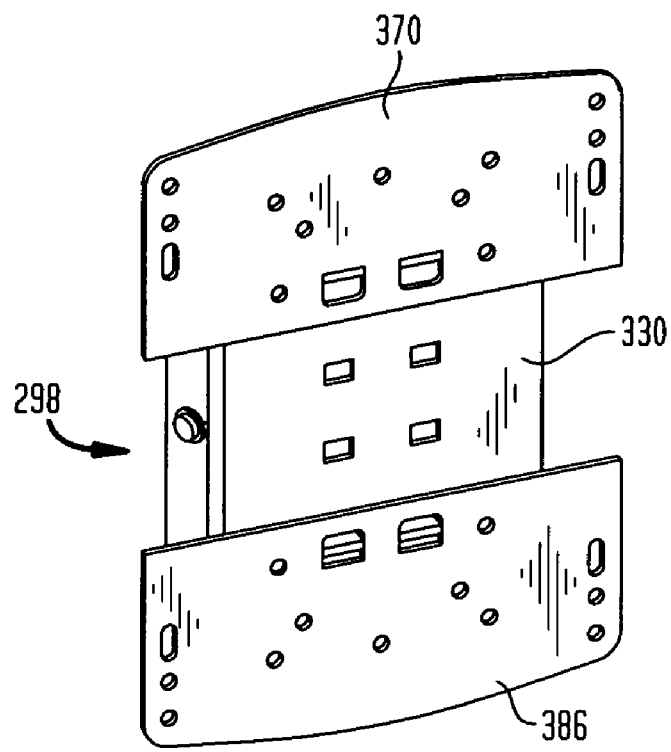
FIG. 14B shows the top and bottom expansion plates of FIG. 14A in an expanded configuration.

FIG. 14B shows the top expansion plate 370 and the bottom expansion plate 386 secured to the monitor plate 330 in an expanded configuration. In certain preferred embodiments, the expanded configuration may be a 200×200 mm configuration.

Figure 15A:
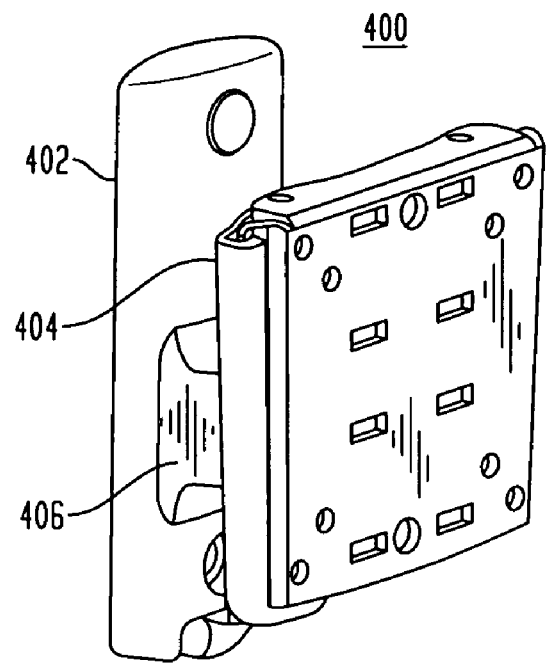
FIGS. 15A and 15B show a tilt and pan mount of a television mounting system, in accordance with certain preferred embodiments of the present.
Figure 15B:
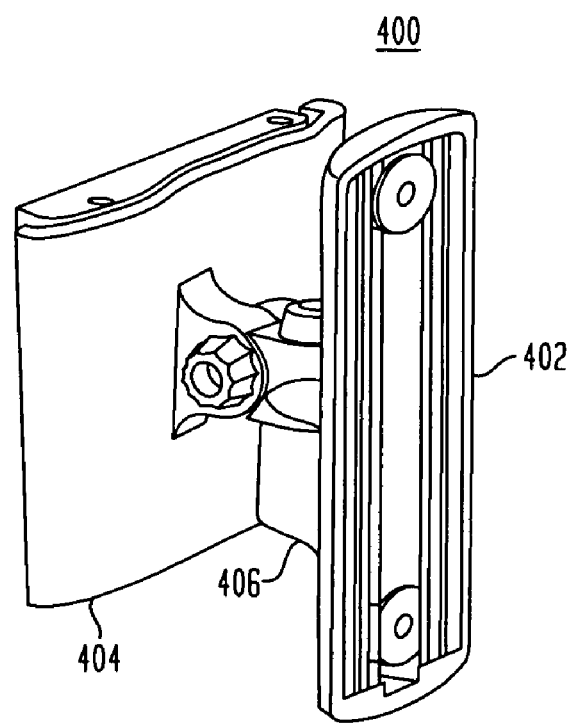

Referring to FIGS. 15A and 15B, in further preferred embodiments of the present invention, a television mounting system includes a tilt and pan mount 400. The tilt and pan mount 400 includes a wall mount 402 that is attached to a wall, a monitor plate adapter 404 and a linkage 406 that couples the monitor plate adapter with the wall mount. As will be described in more detail below, the linkage 406 enables the monitor plate adapter to pan and tilt relative to the wall mount 402.

Figure 16B:
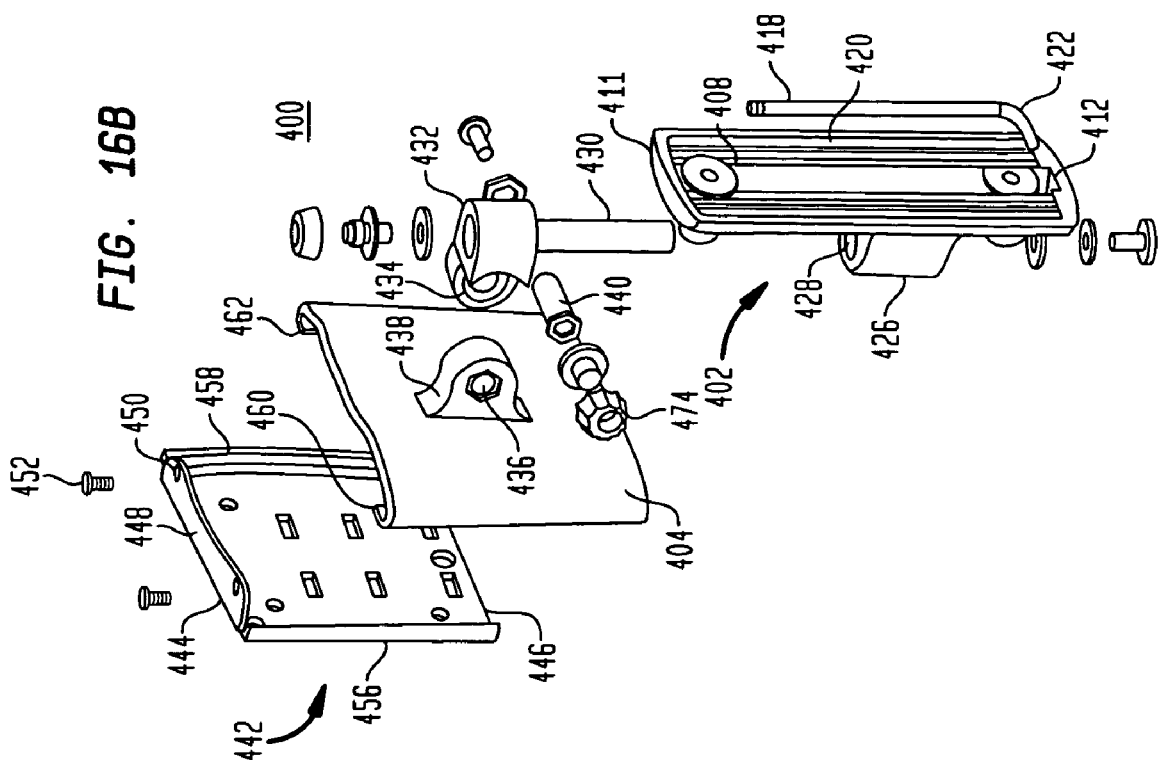
FIGS. 16A and 16B show exploded views of the tiltable and pan mount of FIGS. 15A and 15B.
Figure 16A:
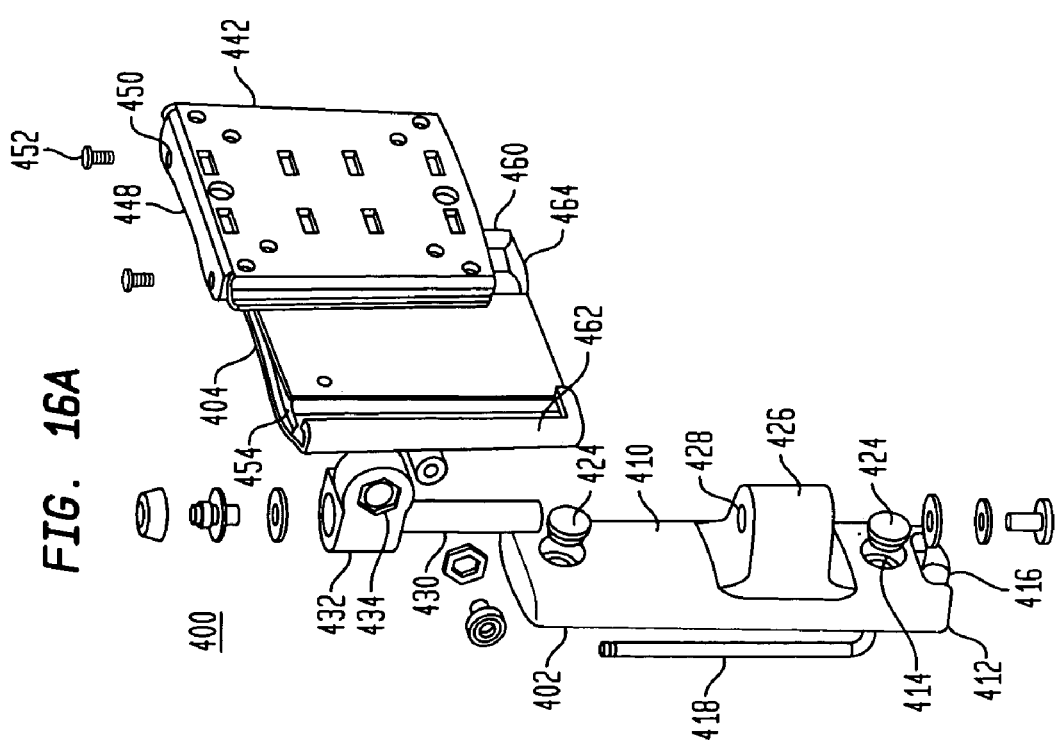

Referring to FIGS. 16A and 16B, the tilt and pan mount 400 includes the wall mount 402 having a first face 408 that is abutted against a wall and a second face 410 that preferably faces away from the wall. The wall mount 402 also includes an upper end 410 and a lower end 412. The wall mount has one or more openings 414 extending from the first face 408 to the second face 410. Fasteners may be passed through the openings 414 for securing the wall mount to a wall. Referring to FIG. 16A, the lower end 412 of the wall mount 402 includes a ledge 416 that supports a portion of an Allen wrench 418. Referring to FIG. 16B, an elongated groove or slot 420 is formed in the rear face 408 of the wall mount 402. When the Allen wrench 418 is rotated in a certain orientation, the elongated shaft of the Allen wrench 418 may be slid into the groove 420. Once the elongated shaft of the Allen wrench is completely inserted into the groove 420, the shorter section 422 of the Allen wrench may be rotated so that it sits atop the ledge 416. The above described structure provides a storage location for the Allen wrench 418 so that it may be continuously stored with the tilt and pan mount and easily accessed when needed for adjusting the tilt and pan mount.

Referring to FIG. 16A, after fasteners have been passed through the openings 414 for securing the wall mount 402 to a wall, plugs 424 may be press fit over the openings so as to provide an aesthetically pleasing appearance for the wall mount.

The wall mount 402 has an articulating link 426 projecting from the front face 410 thereof. The articulating link 426 includes an opening 428 adapted to receive a shaft 430. The shaft 430 preferably fits within the opening 428 and is able to rotate within the opening 428 for providing a panning motion for the monitor plate adapter 404.

Referring to FIGS. 16A and 16B, an upper end of the shaft 430 includes a tilt and pan link 432 attached thereto. The tilt and pan link 432 is preferably attached to the upper end of the shaft 430 and rotates simultaneously with the shaft. The tilt and pan link 432 includes an opening 434 that is preferably aligned with an opening 436 on a tilt link 438 attached to a back side of monitor plate adapter 404. During assembly, a second shaft 440 is passed through aligned openings 434, 436 for coupling the monitor plate adapter 404 with the tilt and pan link 432. The second shaft 440 enables the monitor plate adapter 404 to tilt relative to the tilt and pan link 432. The above-described linkage assembly enables the monitor plate adapter 404 to both pan and tilt relative to the wall plate 402.

The tilt and pan mount 400 also includes a monitor plate 442 that may be assembled with the monitor plate adapter 404. The monitor plate 442 includes an upper end 444 and a lower end 446. The upper end 444 includes a top flange 448 having openings for 450 for receiving fasteners 452. The openings 450 are preferably aligned with openings 454 provided at an upper end of the monitor plate adapter. The monitor plate adapter 442 preferably includes first and second mounting flanges 456, 458. The mounting flanges are preferably slid into mating flanges 460, 462 provided on the monitor plate adapter 404.

Referring to FIGS. 17A and 17B, the wall mount 402 preferably includes a ledge 416 that supports the Allen wrench 418 for storage inside the wall mount. After the longer shaft of the Allen wrench has been slid into a groove formed inside the wall mount 402, the shorter shaft of the Allen wrench may be rotated so that it sits atop the ledge 416. The above-described structure provides a storage location for the Allen wrench and increases the chances that the Allen wrench can be easily retrieved when necessary for adjusting the tilt and pan mount 400.

Referring to FIG. 17A, the monitor plate includes first openings 470 that are adapted to receive the hooks on the expansion plates shown and described above in FIGS. 6A-6B and 7A-7C. The monitor plate 442 includes a plurality of the first openings 470 for providing flexibility for securing the expansion plates to the monitor plate. The monitor plate 442 also include second opening 472 that receive fasteners such as screws for securing the expansion plates to the monitor plate 442. As the monitor plate adapter 404 tilts and pans, the monitor plate 442 move simultaneously therewith.

Referring to FIGS. 17C and 17D, the tilt and pan mount 400 includes a first tightening knob 474 that may be loosened for enabling the monitor plate adapter 404 to tilt relative to the wall mount 402. When the desired tilt is achieved, the tightening knob 474 may be tightened for securing the monitor plate adapter 404 in place and preventing further tilting movement of the monitor plate adapter relative to the wall mount 402.

FIGS. 17E and 17F show the tilt and pan mount 400 including a second tightening knob 476 that may be loosened for enabling the monitor plate adapter 404 to pan relative to the wall mount 402. When the monitor plate adapter 404 has been panned to a preferred location, the tightening knob 476 may be retightened for preventing further panning movement of the monitor plate adapter 404 relative to the wall mount 402.

Figure 18A:
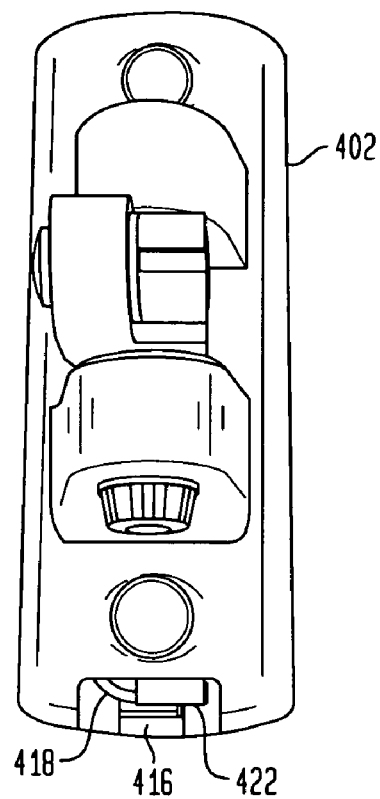
FIG. 18A shows a front perspective view of a wall mount of the tiltable and pan mount of FIG. 15A.
Figure 18B:
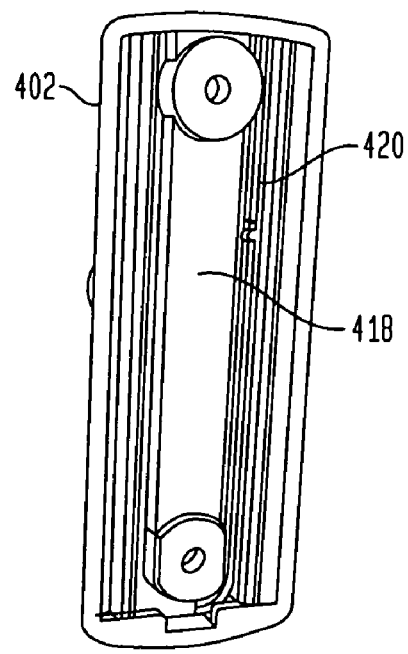
FIG. 18B shows a rear perspective view of the wall mount of FIG. 18A.

FIGS. 18A and 18B show the Allen wrench 418 stored inside the wall mount 402. Referring to FIG. 18B, the wall mount 402 includes an elongated groove or channel 420 that receives the long shaft of the Allen wrench 418. When the long shaft of the Allen wrench 418 has been fully inserted into the groove 420, the short shaft 422 of the Allen wrench 418 may be rotated so that it sits atop the ledge 416 at a lower end of the wall mount 402. The structures shown in FIGS. 18A and 18B enables the Allen wrench to be stored with the wall mount 402 at all times and easily retrieved when necessary for adjusting the tilt and pan mount shown in FIGS. 17A-17F.

Figure 19A:
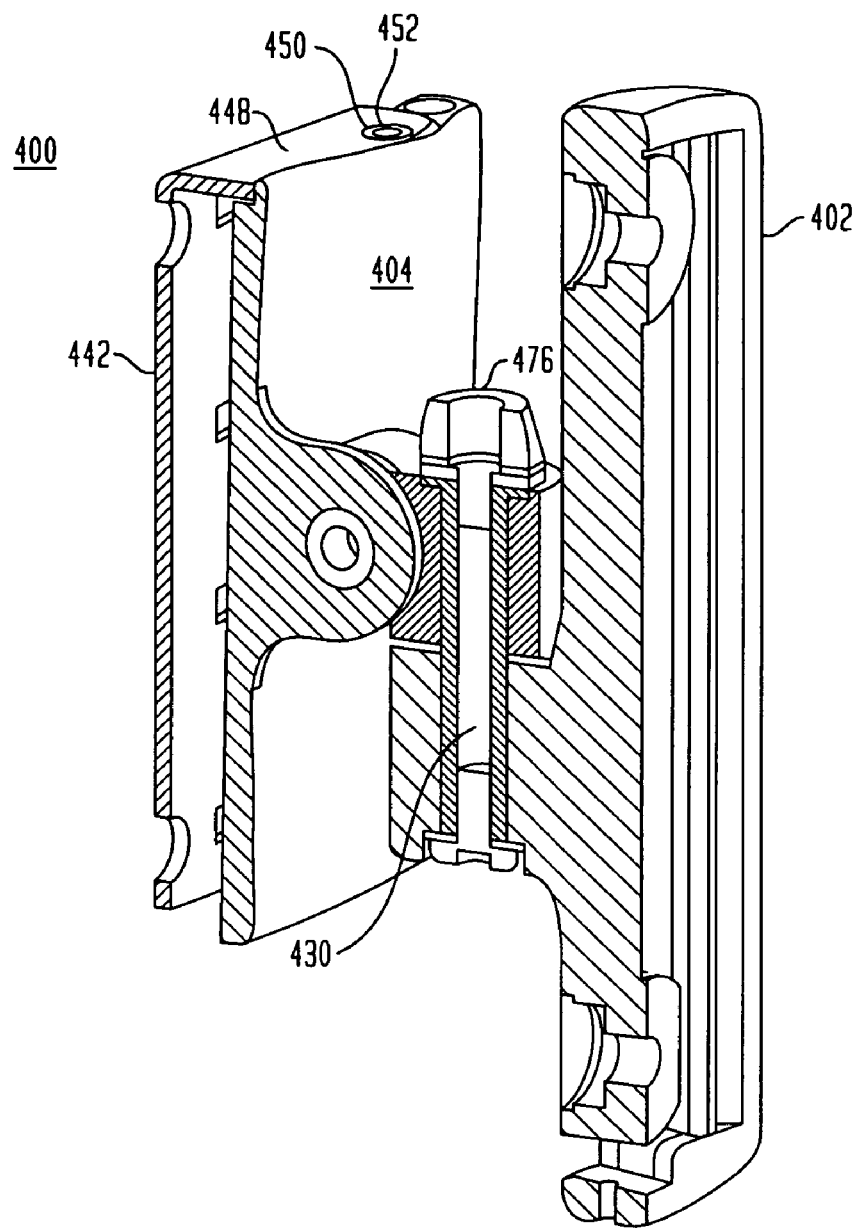
FIG. 19A shows a cross sectional view of the tilt and pan mount of FIG. 18A.
Figure 19B:
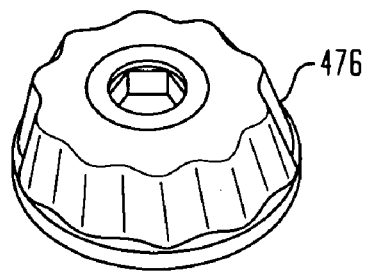
FIG. 19B shows a tightening knob for use with the tilt and pan mount of FIG. 19A.

FIG. 19A shows a cross sectional view of the tilt and pan mount shown in FIG. 17A-17F. The monitor plate adapter 404 is permanently attached to the wall mount 402 by shaft 430. As noted above, the shaft 430 may not be removed from the assembly so that the monitor plate adapter 404 is permanently attached to the wall mount 402. Referring to FIGS. 19A and 19B, a rotatable tightening knob 476 is coupled with an upper end of the shaft 430. When the tightening knob 476 is loosened, the monitor plate adapter 404 is able to articulate relative to the wall mount 402 to provide a panning movement. When the tightening knob 476 is tightened, the monitor plate adapter 404 is secured in place and is no longer able to pan relative to the wall mount 402.

When the monitor plate 442 is assembled with monitor plate adapter 404, top flange 448 abuts against a shelf provided at an upper end of the monitor plate adapter. A fastener 452 may then be passed through opening 450 for securing the monitor plate 442 to the monitor plate adapter 404.

Figure 20A:
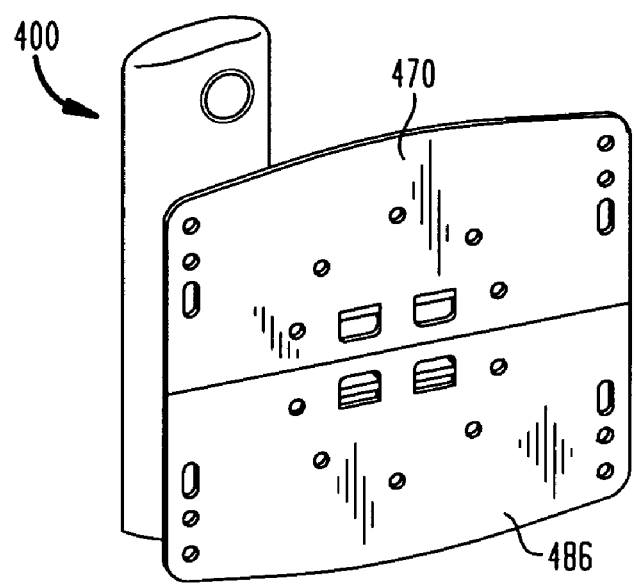
FIG. 20A shows a perspective view of a tilt and pan mount of FIG. 15A having top and bottom expansion plates secured thereto.
Figure 20B:
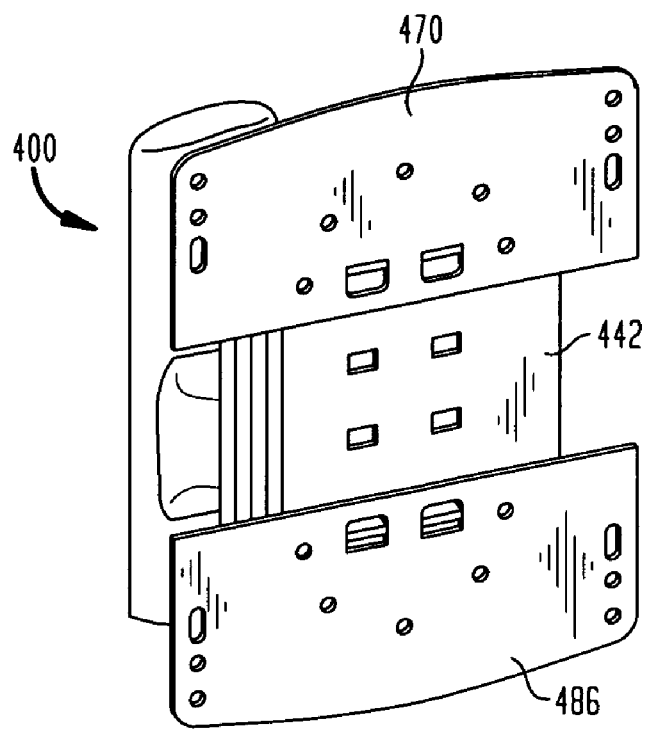
FIG. 20B shows the tilt and pan mount of FIG. 20A with the top and bottom expansion plates in an expanded configuration.

FIG. 20A shows the tilt and pan mount 400 of FIGS. 17A-17F with a top expansion plate 470 and a bottom expansion plate 486 secured to a monitor plate (not shown). In FIG. 20A, the top and bottom expansion plates 470, 486 are in a non-expanded configuration. In FIG. 20, the top and bottom expansion plates 470, 486 are secured to the monitor plate 442 of the tilt and pan mount 400 in an expanded configuration. As is evident, the expanded configuration shown in FIG. 20B is able to secure a larger sized television monitor than is possible when using the non-expanded configuration shown in FIG. 20A. The top and bottom expansion plates 470, 486 include a plurality of openings that may have fasteners passed therethrough for attaching a television monitor to the top and bottom expansion plates.

Figure 21:
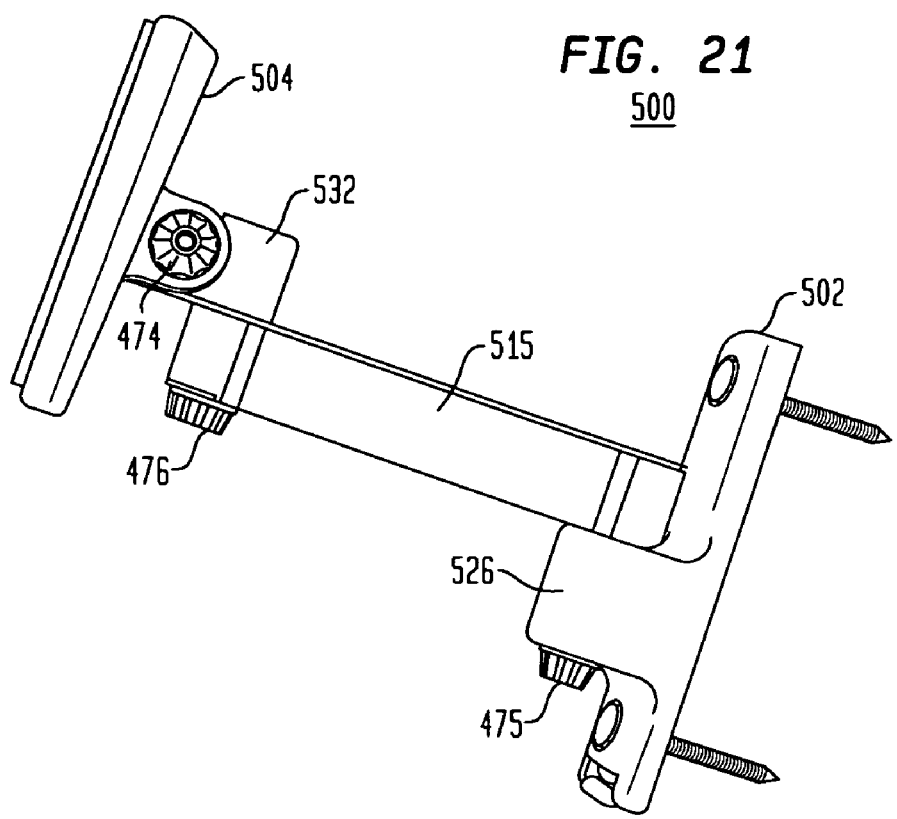
FIG. 21 shows a side view of a tilt, pan and cantilever mount for a television mounting system, in accordance with certain preferred embodiments of the present invention.

FIG. 21 shows a tilt, pan and cantilever mount for a television mounting system, in accordance with further preferred embodiments of the present invention. The tilt, pan an cantilever mount contains many of the features shown and described above in conjunction with the embodiment of FIGS. 17A-17F.

The mount 500 includes a wall mount 502 that is coupled with a monitor plate adapter 504 by an articulating arm 515. The wall mount 502 includes an articulating link 526 having an internal shaft (not shown) that permanently couples the arm 515 with the wall mount through the articulating link 526. The mount 500 also includes a tilt and pan link 532 having a shaft (not shown) that permanently couples the tilt and pan link 532 with the articulating arm 515. The mount 500 also includes another shaft (not shown) that couples the monitor plate adapter 504 with the tilt and pan link 532 to provide a tilting action.

The tilt, pan, and cantilever mount 500 includes three tightening knobs 474, 475 and 476. The first tightening knob 474 may be loosened for enabling the monitor adaptor plate 504 to tilt relative to the wall mount 502. The second tightening knob 475 may be loosened for enabling the articulating arm 515 to articulate relative to the wall mount 502. The third tightening knob 476 may be loosened for enabling the tilt and pan link 532 to articulate relative to the articulating arm 515. The shafts that interconnect the components are preferably permanent connections so that the arm 515 may not be decoupled from the articulating link 526 and the tilt and pan link 532. Similarly, the shaft permanently couples the monitor plate adaptor 504 with the tilt and pan link 532 so that it cannot be disassembled. After the monitor plate adaptor 504 has been panned and tilted to the appropriate orientation, the tightening knobs 474, 475 and 476 may be tightened for holding the monitor adaptor plate 504 stationary relative to the wall mount 502.

The articulating arm 515 may have a hollow channel extending from a first end to a second end thereof. Cables such as audio, video and/or power cables may be passed through the channel extending from the first end to the second end of the articulating arm 515. The channel in the articulating arm 515 enables the cables to be controlled and directed as they extend from the wall mount 502 to a television monitor secured to the television mounting system 500.

Although the present invention is not limited by any particular theory of operation, it is believed that providing the articulating arm 515 having a length results in the monitor adaptor plate 504 being spaced away from the wall mount 502. As a result, a television monitor may be secured to the television mounting system and panned or tilted without an edge of the monitor striking the wall to which the wall mount 502 is secured. Without the articulating arm 515, a television monitor secured to the television mounting system 500 may strike a wall before it is properly tilted and/or panned to a desired orientation. Thus, the articulating arm 515 provides more space between the television monitor and the wall and provides more flexibility for tilting and panning.

Figure 22A:
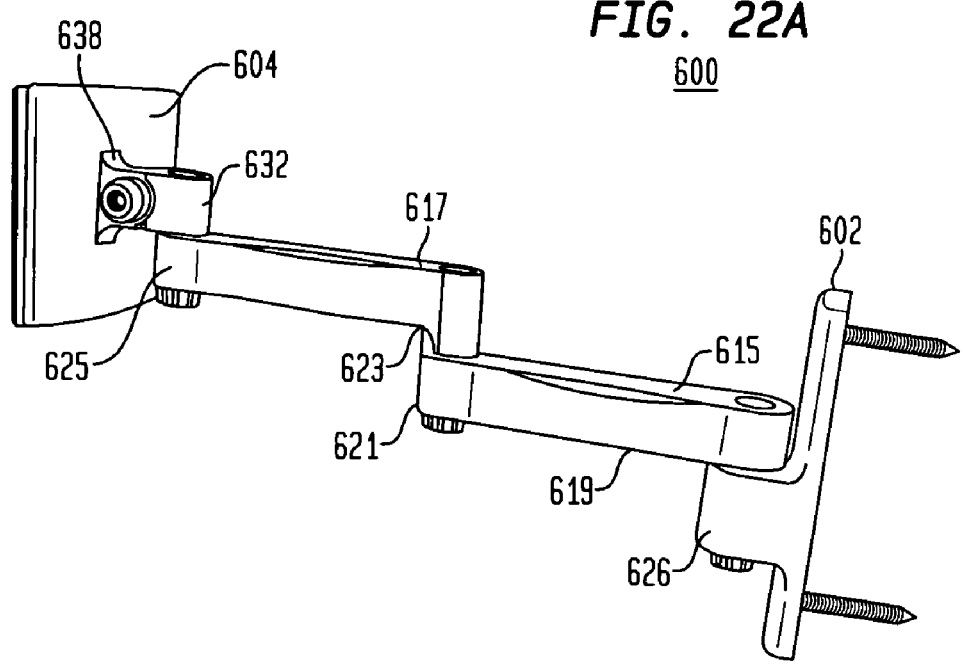
FIGS. 22A-22C show a side view of a tilt, pan and articulating mount for a television mounting system, in accordance with certain preferred embodiments of the present invention.
Figure 22B:
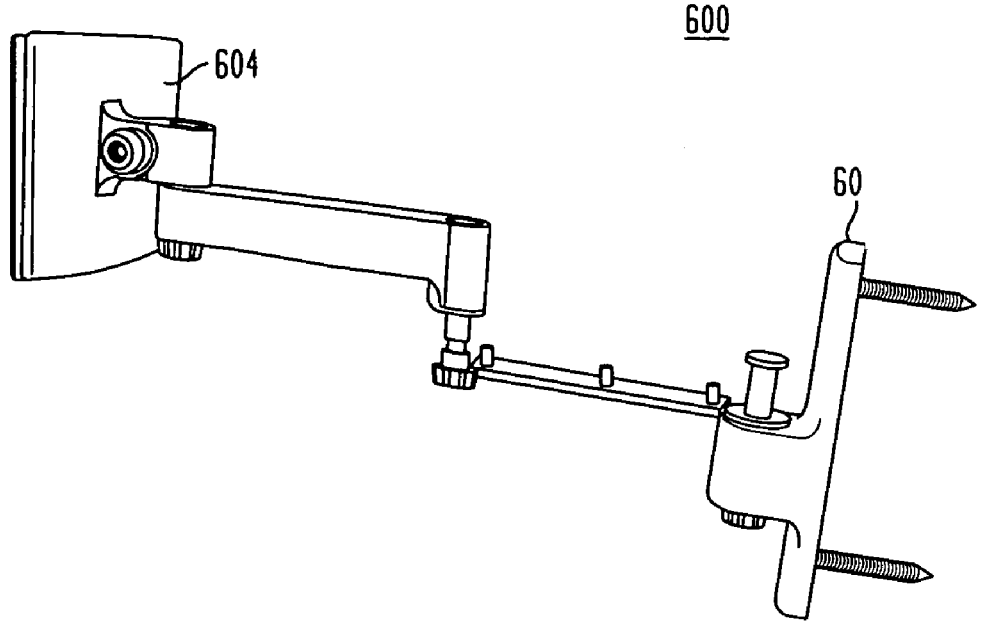
Figure 22C:
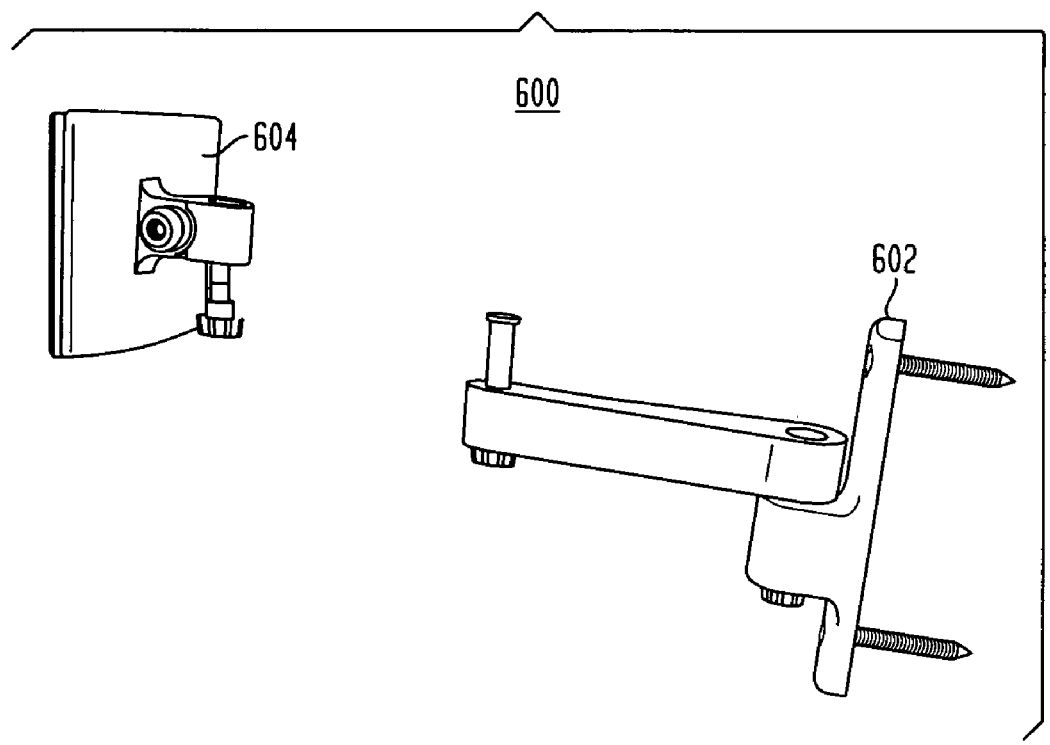

FIGS. 22A-22C show a television mounting system including a tilt, pan and articulating mount 600. The mount 600 includes a monitor plate adaptor 604 that is coupled with a wall mount 602 by a first articulating arm 615 and a second articulating arm 617. The first articulating arm 615 has a first end 619 and a second end 621. The second articulating arm 617 has a first end 623 and a second end 625. The first end 619 of the first articulating arm 615 is coupled with an articulating link 626 secured to the wall mount 602. The second end 621 of the first articulating arm 615 is coupled to the first end 623 of the second articulating arm 617 by an internal shaft (not shown) that permanently connects the first and second arms together. The second end 625 of the second arm 617 is coupled to a tilt and pan link 632 by an internal shaft (not shown). The monitor plate adaptor 604 is coupled with the tilt and pan link 632 by a tilt support 638 that provides for tilting motion.

The tilt, pan and articulating mount includes permanent linkages formed between the first end 619 of the first articulating arm 615 and the articulating support 626. A permanent articulating linkage is also formed between the second end 621 of first arm 615 and the first end 623 of second arm 617. Another permanent articulating linkage is formed between the second end 625 of second arm 617 and the tilt and pan link 632. Finally, a permanent tilting linkage is formed between the tilt and pan link 632 and the tilt support 638 provided on a back face of the monitor plate adaptor 604.

The tilt, pan and articulating mount 600 includes a number of tightening knobs that may be loosened for enabling the parts to articulate and/or tilt. The tightening knobs may be tightened when a desired position for the monitor plate adaptor 604 relative to the wall mount 602 has been obtained. Even if the tightening knobs are completely loosened and removed, the permanent linkages ensure that the tilt, pan and articulating mount cannot be dissembled and/or collapse.

FIG. 22B shows some of the permanent linkages that couple the monitor plate adaptor 604 with the wall mount 602. FIG. 22C shows other permanent linkages that couple the monitor plate adaptor 604 with the wall mount 602.

Figure 23:
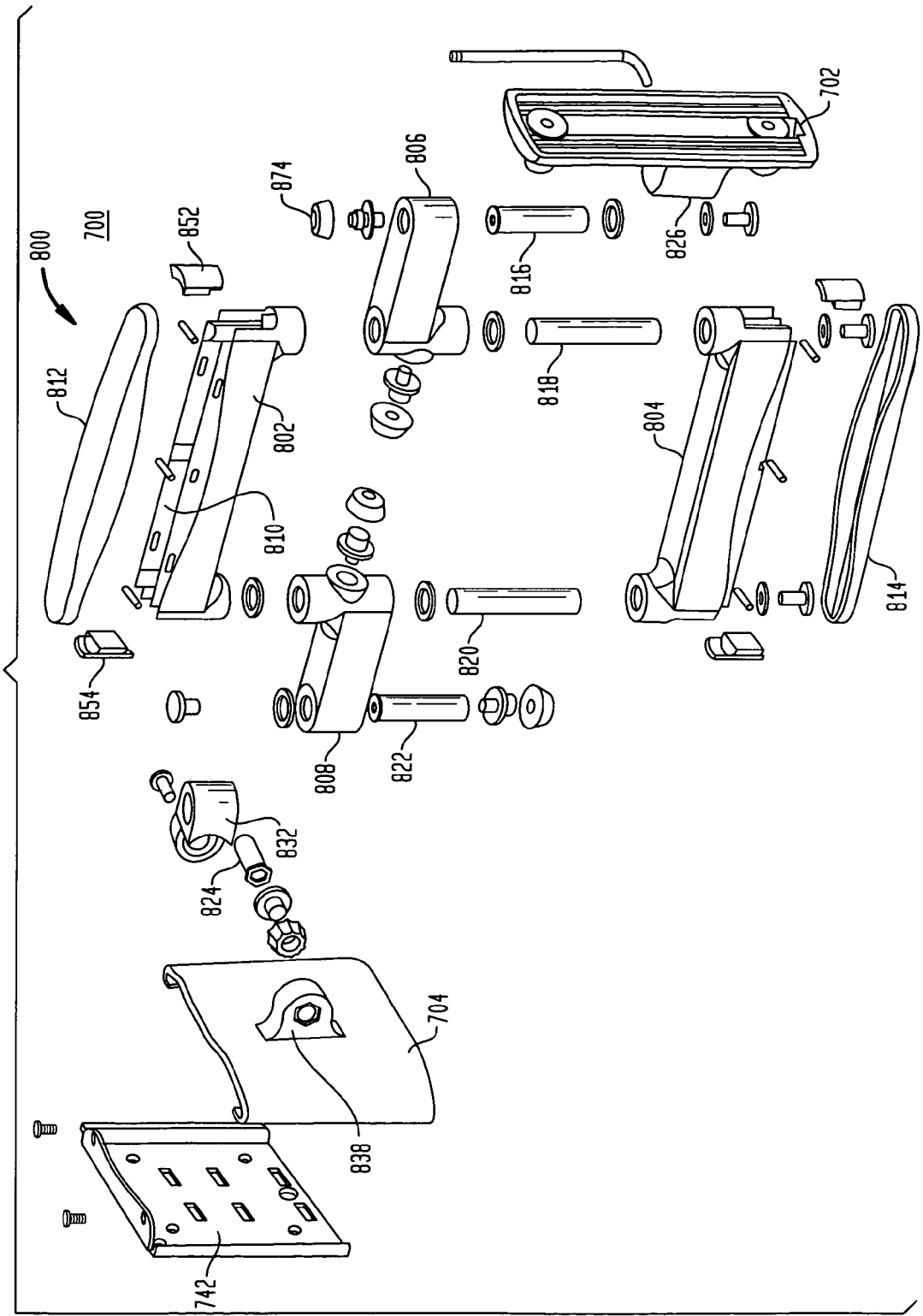
FIG. 23 shows an exploded view of a tilt, pan and articulating mount for television mounting system, in accordance with certain preferred embodiments of the present invention.

Referring to FIG. 23, in accordance with another preferred embodiment of the present invention, a television mounting system includes a tilt, pan and articulating mount 700 having cable management. As used herein, the terminology cable management means that the routing of the audio, video and/or power cables between a wall and a television monitor may be controlled. Controlling these cables may be desirable to enhance the overall aesthetic appearance of a television system. Control of the cables may also be desirable so as to minimize interference between the power, audio and/or video cables. For example, running a power cable directly next to an audio cable may result in signal interference that diminishes the quality of the audio signal. The same may also apply for video cables. Thus, the cable management system seeks to route the video, audio and/or power cables so as to maximize aesthetic appearance and/or maximize the quality of the audio and video of the television monitor.

The tilt, pan and articulating mount 700 includes a wall mount 702, a monitor plate adaptor 704 and a monitor plate 742 that are substantially similar in design and function as the embodiment shown and described above in conjunction with FIGS. 17A-17F. The mount 700 includes a cable management system 800 that controls the audio, video and power cables extending from the wall mount 702 to a television monitor secured to the monitor plate 742. The cable management system 800 also incorporates a structure that enables the monitor adaptor plate 704 to pan and tilt relative to the wall mount 702.

As shown in FIG. 23, the mounting system includes a first housing 802 and a second housing 804 that are coupled together by a first articulating link 806 and a second articulating link 808. The first housing 802 includes a channel 810 extending from a first end to a second end thereof. Audio, video and/or power cables may be passed through the channel from the first end to the second end. Before the cables may be passed through the channel 810, the end caps 852, 854 are removed. In addition, a top cap 812 is removed for accessing the channel 810. The second housing 804 has a similar structure as the first housing including a channel (not shown). A top cap 814 is removed for accessing the channel of the second housing 804.

The tilt, pan and articulating mount 700 includes a series of permanent linkages that interconnect the components and enable the monitor plate adaptor 704 to articulate and tilt relative to the wall mount 702. The mount system 700 includes a first shaft 816 that permanently connects a first end of first articulating link 806 with articulating support 826 provided on wall mount 702. The mount system 700 also includes a second shaft 818 that permanently couples a second end of the first articulating link 806 with the first housing 802 and the second housing 804. The mount system 700 includes a third shaft 820 that permanently couples the first end of the second articulating link 808 with the first housing 802 and the second housing 804. The mount system 700 also has a fourth shaft 822 that permanently couples the second end of the second articulating link 808 with a tilt and pan link 832. Finally, the mount system 700 includes a fifth shaft 824 that permanently couples the tilt and pan link 832 with a tilt linkage 838 provided on a rear surface of the monitor plate adaptor 704. The mount system 700 also includes tightening knobs 874 that are coupled with the shafts 816, 818, 820, 822 and 824. The tightening knobs 874 may be loosened for enabling articulating or tilting motion of the monitor plate adapter 704. The tightening knobs 874 may be tightened when the monitor plate adaptor 704 has been articulated and/or tilted to a desired orientation relative to the wall mount 702.

Referring to FIG. 23, similar to the structure disclosed in embodiments above, the shafts 816, 818, 820, 822 and 824 form permanent linkage between the various components of the assembly. The first shaft 816 forms a permanent linkage between the first articulating link 806 and the wall mount 702 that enables the first articulating link 806 to articulate relative to the wall mount 702. The second shaft 818 forms a permanent linkage between an opposite end of the first articulating link 806 and first ends of the first and second housings 802, 804. The second shaft 818 enables the first and second housings 802 and 804 to articulate relative to the first articulating link 806. The third shaft 820 forms a permanent linkage between the second articulating link 808 and first and second housings 802, 804. The third shaft 820 enables the second articulating link 808 to articulate relative to the first and second housings 802, 804. The fourth shaft 822 provides a permanent linkage between the second articulating link 808 and the pan and tilt link 832. The fourth shaft 822 enables the pan and tilt link 832 to articulate relative to the first link 806. The fifth shaft 824 provides a permanent link between the monitor plate adapter 704 and the pan and tilt 832. The fifth shaft 824 enables the monitor plate adapter 704 to tilt relative to the pan and tilt link 832. The assembly 700 also includes tightening knobs 874. The tightening knobs are preferably coupled with the five shafts 816, 818, 820, 822 and 824. When the tightening knobs are loosened, the components linked by the shafts are able to move relative to one another. When the tightening knobs 874 are tightened, however, the components linked by the shafts are not free to move relative to one another.

Figure 24:
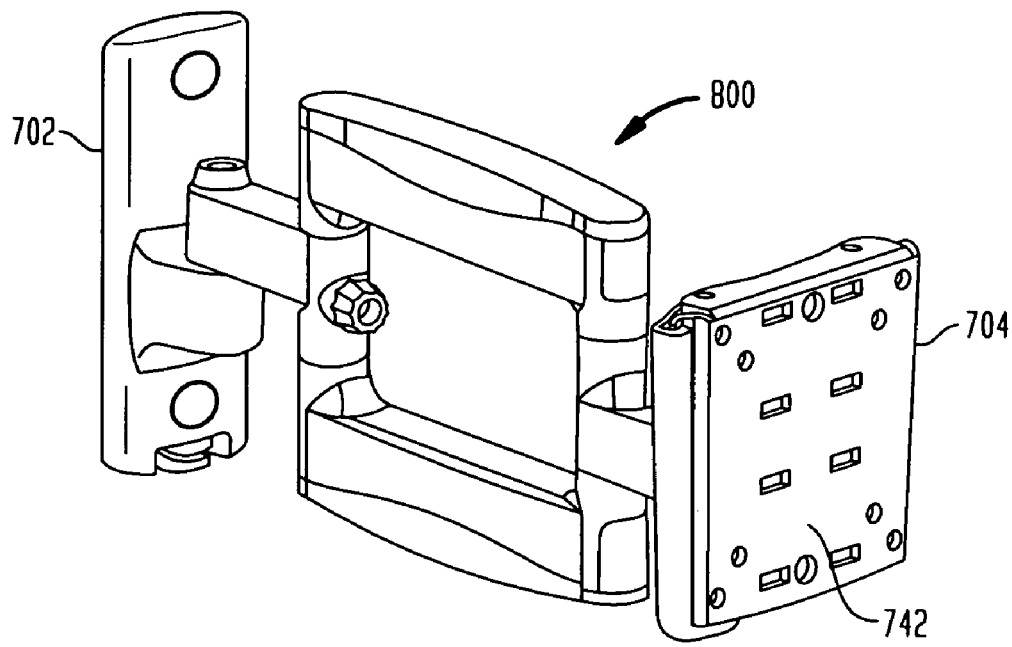
FIG. 24 shows the tilt, pan and articulating mount of FIG. 23 in an assembled configuration.
Figure 25:
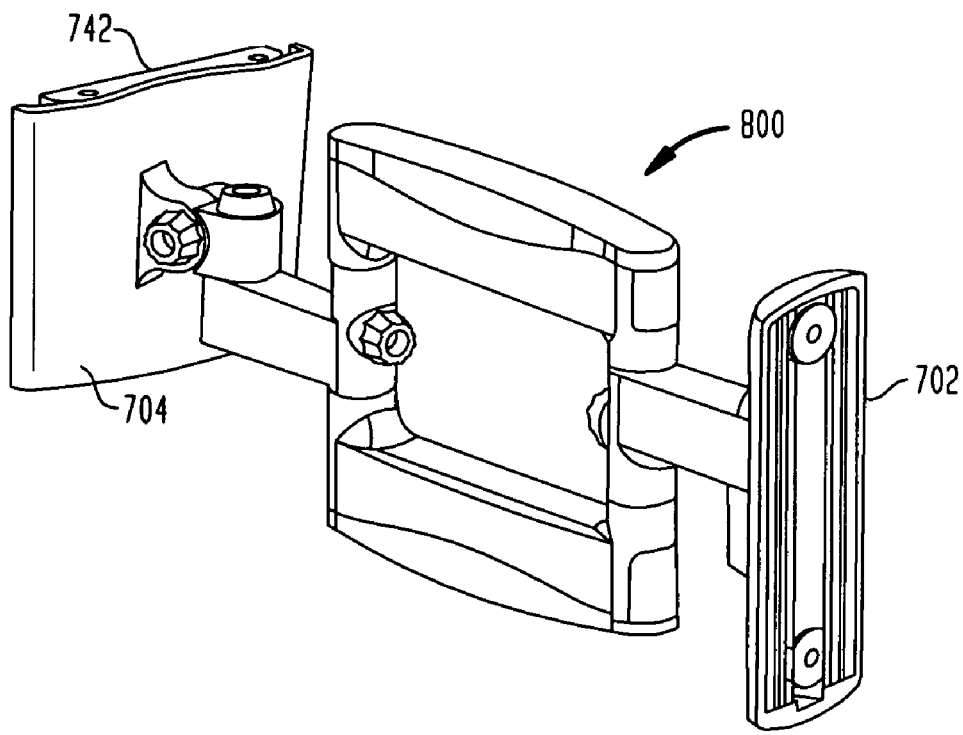
FIG. 25 shows another view of the tilt, pan and articulating mount shown in FIG. 24.

FIGS. 24 and 25 show the assembly 700 of FIG. 23 after the components have been assembled together. The assembly includes wall mount 702, cable management system 800, monitor plate adapter 704 and monitor plate 742.

FIG. 26 shows a rear side of wall mount 702 including a groove 720 formed in the rear surface of the wall mount for securing an Allen wrench 718.

FIG. 27 shows a cross sectional view of the assembly 700 shown in FIG. 25. As shown in FIG. 27, first shaft 816 forms a permanent articulating linkage between wall mount 702 and first articulating linkage 806. The second shaft 818 forms a permanent linkage between first articulating link 806 and first housing 802 and second housing 804. Third shaft 820 forms a permanent link between second articulating link 808 and first and second housings 802, 804. Fourth shaft 822 provides a permanent articulating linkage between second articulating link 808 and the pan and tilt linkage 832. Fifth shaft 824 provides a tilting linkage between the monitor plate adapter 704 and the pan and tilt linkage 832.

Figure 28:
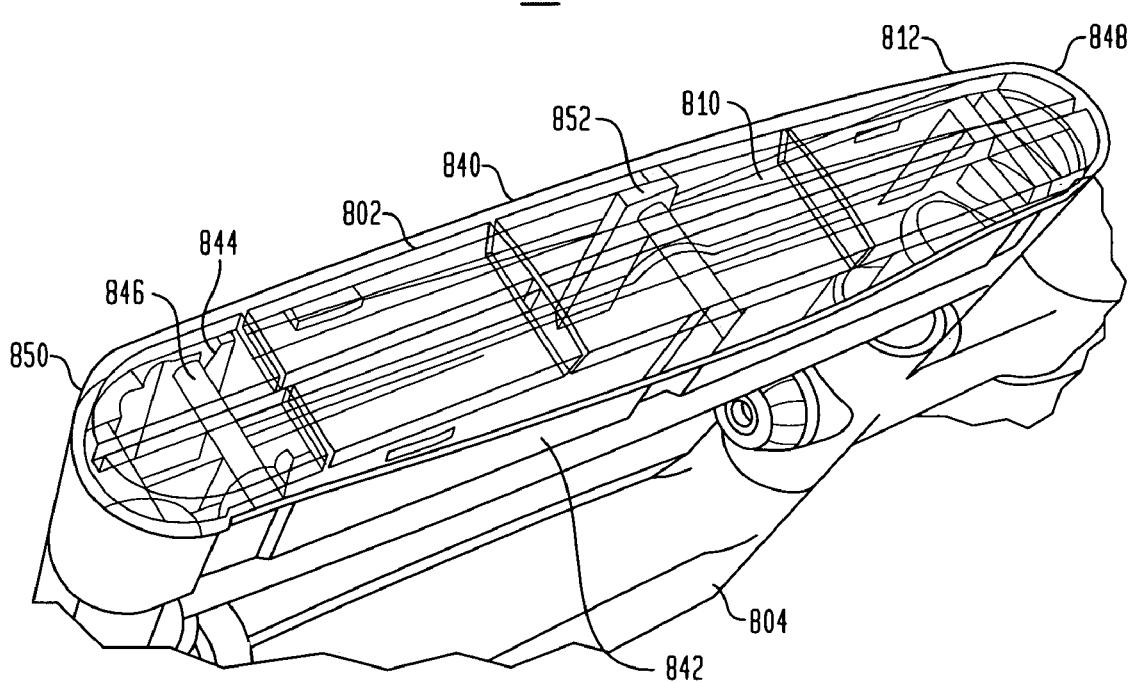
FIG. 28 shows a top view of a cable management system of the tilt, pan and articulating mount shown in FIGS. 24 and 25.

Referring to FIG. 28, the first housing 802 has a channel 810 that extends between first side wall 840 and second side wall 842. The first and second side walls 840, 842 include aligned L-shaped slots 844 that are adapted to receive pins 846. If it is desirable to pass audio/video and or power cables through the channel 810, the cap 812 is removed to expose channel 810. The cables are then passed through the well from a first end 848 to a second end 850 thereof. Once the cables have been properly positioned within the well 810, the pins 846 are positioned in the L-shaped slots and advanced towards the second end 850 of the housing 802. The cap 812 is then secured atop the housing 802 and over the channel 810. The underside of the cap 812 includes fingers 852 that are preferably advanced into the L-shaped slots 844. The insertion of the fingers 852 into the L-shaped slots prevents the pins 846 from retracting from the slots.

Referring to FIG. 23, when audio, video and/or power cables are passed through the housing 802, the end caps 852, 854 must first be removed from the respective first and second ends 848, 850 of the housing 802. The end caps 852, 854 remain removed from the housing 802 when cables extend therethrough.

Referring to FIGS. 27 and 28, the second housing 804 has a structure similar to the structure found in the first housing 802. Thus, audio, video and/or power cables may also be passed through a channel extending between first and second ends of the second housing 804. In certain preferred embodiments, it may be advisable to separate audio and video cables from power cables. Thus, in particular embodiments, the audio and video cables may be passed through the first housing 802 and the power cables may be passed through the second housing 804. Such a configuration may minimize interference caused by current running through the power cables. In other embodiments, the audio and video cables may be passed through the second housing 804 and the power cable may be passed through the first housing 802. The particular configuration is not significant so long as the audio and video cables are separated from the power cables. In still other preferred embodiments, it may be advisable to separate the audio and video cables from one another by passing the audio cables through one of the housing and the video cables through the other housing.

Figure 29:
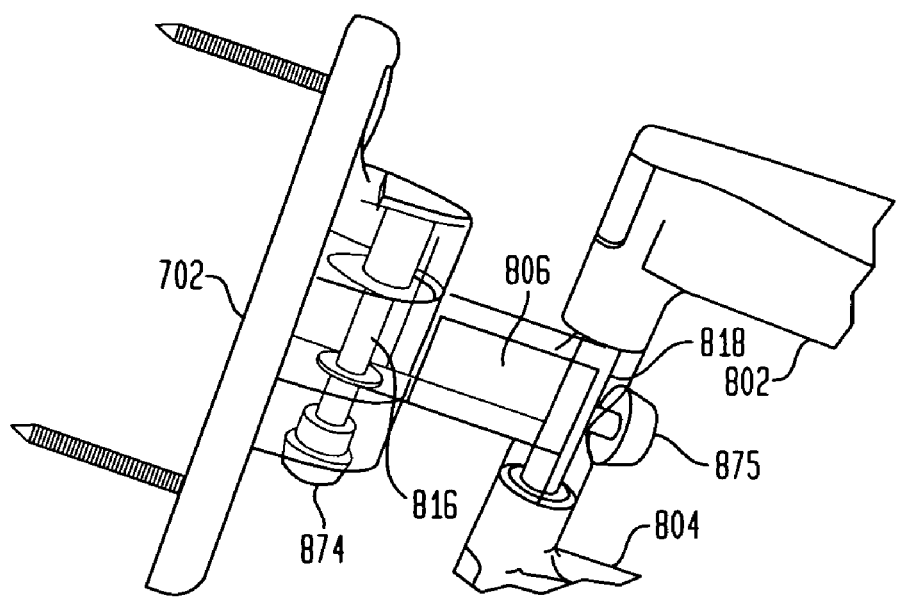
FIG. 29 shows a permanent linkage system for the tilt, pan and articulating mount shown in FIG. 25.

FIG. 29 shows the permanent linkage of the first articulating link 806 with the first housing 802 and the second housing 804. The second shaft 818 provides the permanent, unbreakable linkage. The tightening knob 875 may be loosened for allowing articulating movement of the first articulating link 806 relative to the first and second housing 802, 804. The knob 875 may be tightened for preventing further movement of the first articulating link 806 relative to the first and second housings 802, 804. The assembly 700 also includes another permanent linkage formed using first shaft 816 that connects first articulating linkage 806 with wall mounts 702. Tightening knob 874 may be loosened for enabling articulating movement between the wall mount 702 and the first articulating link 808. The tightening knob 874 may be tightened for preventing further articulating movement between the wall mount 702 and the first articulating link 806.

Figure 30:
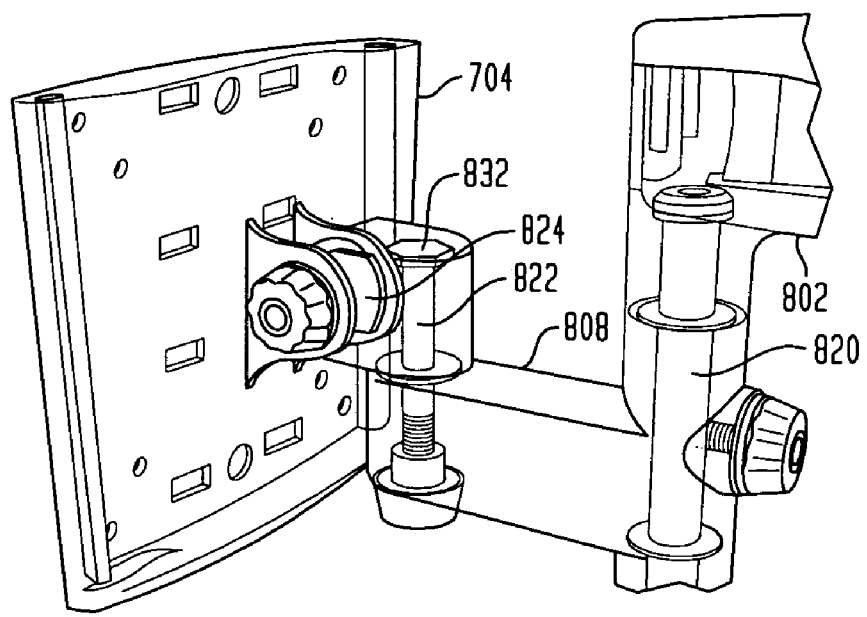
FIG. 30 shows other views of a permanent linkage system for the tilt, pan and articulating mount shown in FIG. 25

FIG. 30 shows an additional permanent linkage interconnecting the monitor plate adapter 704 and the second articulating link 808. The permanent linkage is providing by the fourth shaft 822 that permanently couples the second articulating link 808 and the tilt and pan link 832. The fourth shaft 822 provides a permanent, unbreakable articulating linkage between the tilt and pan link 832 and the second articulating link 808. FIG. 30 also shows a fifth shaft 824 that provides a permanent panning link between the monitor plate adapter 704 and the tilt and pan link 832. In addition, the assembly includes third shaft 820 that provides a permanent link between the first housing 802 and the second housing (not shown) with the second articulating link 808. As described above, the tightening knobs may be loosened or tightened depending on whether tilting and/or panning movement is desired.

Figure 31A:
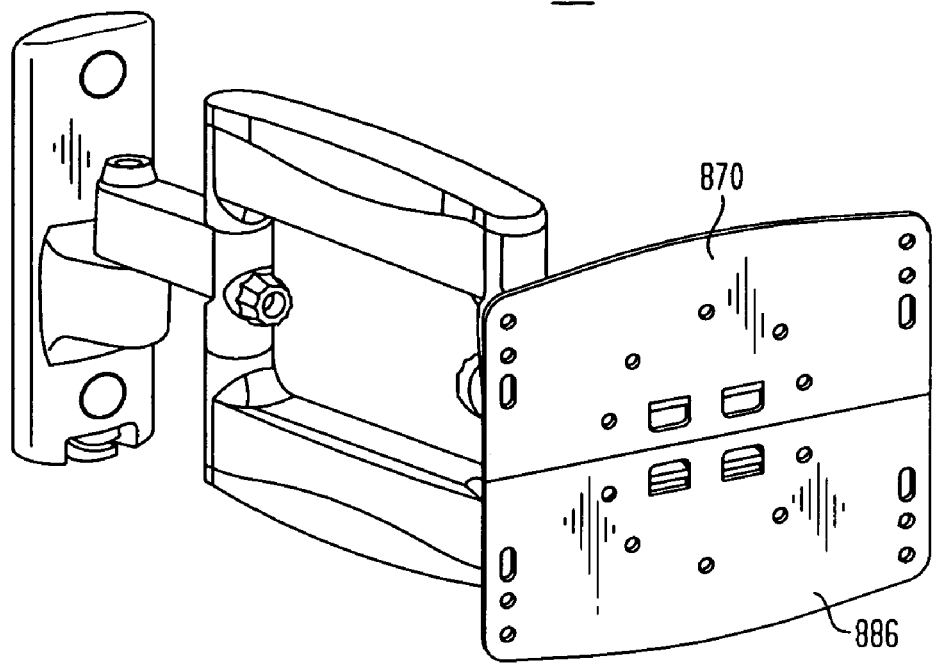
FIG. 31A shows top and bottom expansion plates attached to the tilt, pan and articulating mount shown in FIG. 24.
Figure 31B:
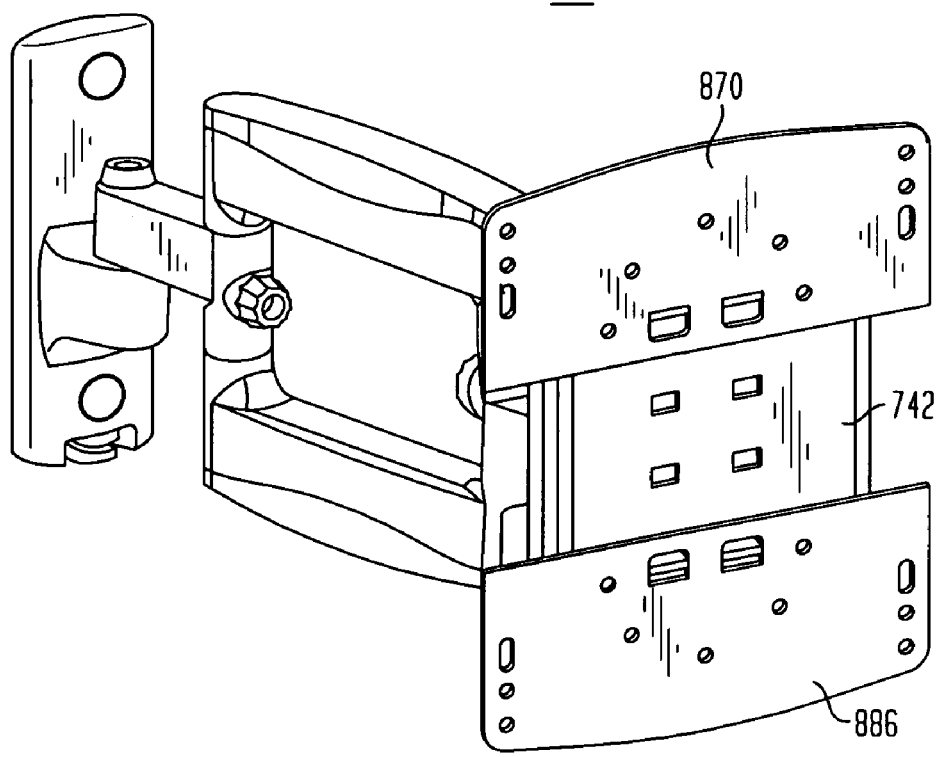
FIG. 31B shows the top and bottom expansion plates of FIG. 31A in expanded configuration.

FIG. 31A shows the assembly shown in FIG. 24 with a top expansion plate 870 and a bottom expansion plate 886 secured to a monitor plate (not shown). FIG. 31B shows top expansion plate 870 and bottom expansion plate 886 secured to monitor plate 742. In FIG. 31A, the expansion plates 870, 886 are in a normal or non-expanded configuration. In FIG. 31B, the expansion plates 870, 886 are in an expanded configuration for securing a larger sized television.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television mounting system comprising:
 a first plate having an upper end, a lower end, and first and second sides extending between the upper and lower ends, wherein first and second mating flanges, respectively, extend along the first and second sides of the first plate;
 a monitor plate mountable on said first plate, said monitor plate having an inner face, an outer face, an upper end, a lower end and first and second sides extending between the upper and lower ends;
 a first mounting flange having a first hook extending along the first side of said monitor plate; and
 a second mounting flange having a second hook extending along the second side of said monitor plate, wherein, when mounting said monitor plate on said first plate, the first and second mating flanges on the first plate are respectively captured within the first and second mounting flanges of the monitor plate and said first and second hooks of said mounting flanges respectively engage said first and second mating flanges on said first plate.

2. The television mounting system of claim 1, wherein said monitor plate comprises openings extending therethrough for securing said monitor plate to a television monitor.

3. The television mounting system of claim 1, wherein said monitor plate comprises openings extending therethrough for securing at least one expansion plate to said monitor plate.

4. The television mounting system of claim 1, wherein said monitor plate further comprises an L-shaped flange projecting from the lower end thereof and a threaded opening arranged therein; and said first plate also includes an L-shaped flange projecting from the lower end thereof and a threaded opening arranged therein, the threaded openings of the L-shaped flanges of the monitor and first plates being aligned when said monitor plate is mounted on said first plate.

5. The television mounting system of claim 1, wherein said first plate and monitor plate comprise L-shaped flanges projecting from the lower ends thereof, the L-shaped flanges having a threaded opening, said threaded openings of the L-shaped flanges being aligned when said monitor and first plates are in assembled position; and
 a threaded screw extending through the aligned threaded openings at the lower end of the monitor and first plates.

\* \* \* \* \*

UNITED STATES PATENT AND TRADEMARK OFFICE
CERTIFICATE OF CORRECTION

| | | |
|---|---|---|
| PATENT NO. | : 7,726,617 B2 | Page 1 of 1 |
| APPLICATION NO. | : 12/005123 | |
| DATED | : June 1, 2010 | |
| INVENTOR(S) | : Michael P. Zambelli et al. | |

It is certified that error appears in the above-identified patent and that said Letters Patent is hereby corrected as shown below:

Column 1, line 21, delete "traditions" should read --traditional--.
Column 1, line 23, "and that they" should read --and they--.
Column 1, line 25, delete "is" and insert "are".
Column 1, line 28, "offer" should read --offers--.
Column 1, line 43, "televisions" should read --television--.
Column 1, line 44, "televisions" should read --television--.
Column 1, line 54, "embodiments" should read --embodiment--.
Column 3, line 56, "include" should read --includes--.
Column 9, line 62, "for television" should read --for a television--.
Column 13, line 43, "having a different" should read --having different--.
Column 14, line 42, "opening" should read --openings--.
Column 16, line 33, "embodiments" should read --embodiment--.
Column 17, line 7, "couples" should read --couple--.
Column 18, line 26, "include" should read --includes--.
Column 18, line 29, "move" should read --moves--.
Column 19, line 24, "an" should read --and--.
Column 23, line 26, "providing" should read --provided--.
Column 24, line 42, "and monitor" should read --and said monitor--.

Signed and Sealed this
Thirty-first Day of May, 2011

David J. Kappos
*Director of the United States Patent and Trademark Office*